United States Patent
Ozawa et al.

(10) Patent No.: US 6,462,724 B1
(45) Date of Patent: Oct. 8, 2002

(54) DISPLAY DEVICE AND ELECTRONIC EQUIPMENT EMPLOYING THE SAME

(75) Inventors: Yutaka Ozawa, Minowa-Machi; Akira Inoue, Suwa; Katsunori Yamazaki, Matsumoto; Tsuyoshi Maeda, Yamanashi-Ken; Chiyoaki Iijima, Inu, all of (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 09/269,540

(22) PCT Filed: Jul. 27, 1998

(86) PCT No.: PCT/JP98/03343

§ 371 (c)(1),
(2), (4) Date: Jul. 1, 1999

(87) PCT Pub. No.: WO97/01788

PCT Pub. Date: Jan. 16, 1997

(30) Foreign Application Priority Data

Jul. 25, 1997 (JP) ............................................. 9-200567
Sep. 9, 1997 (JP) ............................................. 9-244005
Mar. 2, 1998 (JP) ........................................... 10-049876

(51) Int. Cl.[7] ................................................. G09G 3/36
(52) U.S. Cl. ............................. 345/87; 345/89; 345/90; 345/96; 345/99; 345/103; 349/5; 349/9; 349/57; 349/121; 349/117
(58) Field of Search .......................... 345/87, 204, 103, 345/9, 104, 96, 90, 89, 99; 349/9, 104, 117, 121, 57, 5; 359/487

(56) References Cited

U.S. PATENT DOCUMENTS

| | | | | |
|---|---|---|---|---|
| 5,416,496 A | * | 5/1995 | Wood | 345/102 |
| 6,014,195 A | * | 10/2000 | Sakamoto et al. | 349/96 |
| 6,130,728 A | * | 10/2000 | Tsujikawa et al. | 349/9 |
| 6,147,735 A | * | 11/2000 | Yamazaki et al. | 349/117 |

FOREIGN PATENT DOCUMENTS

| | | |
|---|---|---|
| JP | 9-506984 | 7/1997 |
| JP | 9-506985 | 7/1997 |
| JP | 10-260402 | 9/1998 |
| WO | WO 95/17303 | 6/1995 |
| WO | WO 95/17691 | 6/1995 |
| WO | WO 95/17692 | 6/1995 |
| WO | WO 95/17699 | 6/1995 |
| WO | WO 95/27919 | 10/1995 |
| WO | WO 96/19347 | 6/1996 |
| WO | WO 97/01439 | 1/1997 |
| WO | WO 97/01440 | 1/1997 |
| WO | WO 97/01610 | 1/1997 |
| WO | WO 97/01774 | 1/1997 |
| WO | WO 97/01778 | 1/1997 |
| WO | WO 97/01780 | 1/1997 |
| WO | WO 97/01781 | 1/1997 |
| WO | WO 97/01788 | 1/1997 |
| WO | WO 97/01789 | 1/1997 |
| WO | WO 97/10726 | 1/1997 |
| WO | WO 97/07653 | 2/1997 |

\* cited by examiner

Primary Examiner—Richard Hjerpe
Assistant Examiner—Ali Zamani
(74) Attorney, Agent, or Firm—Harness, Dickey & Pierce, P.L.C.

(57) ABSTRACT

An ON/OFF control signal 105 directive of turning ON in a transmissive display mode or turning OFF in a reflective display mode is output by an ON/OFF state controlling means 111 to a light source 115. The ON/OFF control signal 105 is also output to a data signal converting means 104, and the data signal converting means 104 converts a data signal 102 into a data signal 103 in synchronization with the switching of ON and OFF of the light source 115 so as to prevent positive-negative inversion of the display on a liquid crystal panel 114. A data signal potential supplying means 112 supplies a potential of a data signal based on the data signal 103 to a data signal line 113 so as to drive the liquid crystal panel 114.

32 Claims, 26 Drawing Sheets

FIG. 9
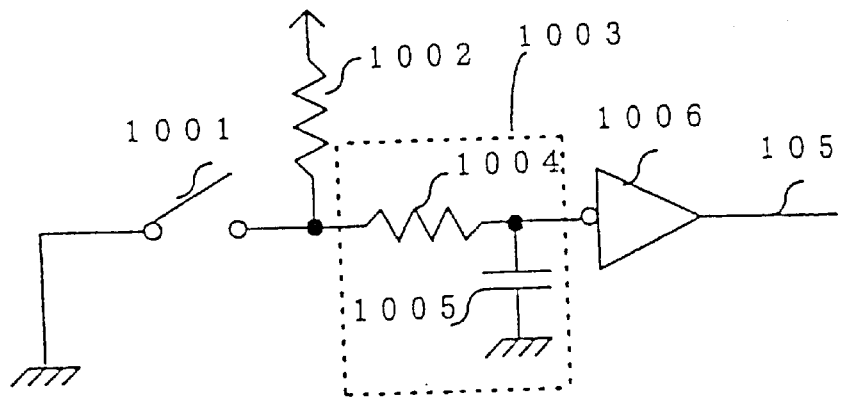
FIG. 10
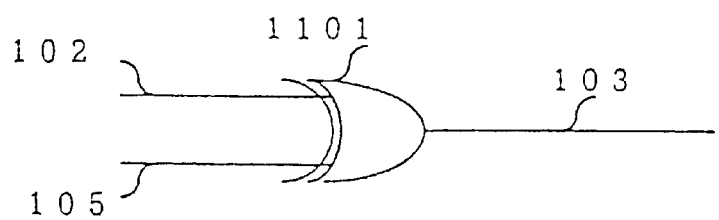
FIG. 11
| ON/OFF CONTROL SIGNAL | DATA SIGNAL a | DATA SIGNAL b |
|---|---|---|
| 0 | 0 | 0 |
| 0 | 1 | 1 |
| 1 | 0 | 1 |
| 1 | 1 | 0 |

| IMAGE DATA | LIGHT INTENSITY [%] | EFFECTIVE VOLTAGE AT REFLECTION | EFFECTIVE VOLTAGE AT TRANSMISSION |
|---|---|---|---|
| 0 0 | 9 5 | V 0 | V 3 |
| 0 1 | 5 0 | V 1 | V 5 |
| 1 0 | 2 0 | V 2 | V 4 |
| 1 1 | 5 | V 3 | V 0 |

FIG. 28

| IMAGE DATA | DISPLAY DATA AT REFLECTION | APPLIED VOLTAGE AT REFLECTION | RELATIVE OPTICAL REFLECTANCE [%] |
|---|---|---|---|
| 0 0 (WHITE) | 0 0 | V0 | 95 |
| 0 1 | 0 1 | V1 | 50 |
| 1 0 | 1 0 | V2 | 20 |
| 1 1 (BLACK) | 1 1 | V3 | 5 |

FIG. 29

| IMAGE DATA | DISPLAY DATA AT TRANSMISSION | APPLIED VOLTAGE AT TRANSMISSION | RELATIVE OPTICAL TRANSMITTANCE [%] |
|---|---|---|---|
| 0 0 (WHITE) | 1 1 | V3 | 95 |
| 0 1 | 1 0 | V2 | 35 |
| 1 0 | 0 1 | V1 | 10 |
| 1 1 (BLACK) | 0 0 | V0 | 5 |

DISPLAY DEVICE AND ELECTRONIC EQUIPMENT EMPLOYING THE SAME

FIELD OF THE INVENTION

The present invention relates to a technical field of display devices and, more particularly, to a display device such as a liquid crystal display that is equipped with a polarized light separator such as a polarizer or a reflective polarizer and that can be used as a reflective type in which external light is reflected to perform display and also as a transmissive type in which the light of a light source is transmitted to perform display, a driving method for the same, and electronic equipment such as a portable telephone, a watch, and a portable information terminal that employ the same.

BACKGROUND ART

Hitherto, in the case of a reflective type display device that makes use of external light to carry out display, the display becomes difficult to view as the quantity of light decreases in a dark place. On the other hand, a transmissive type display device that makes use of a backlight or other light source to carry out display consumes more electric power because of the light source regardless of whether the location where it is placed is bright or dark, and it is therefore not suited for a portable display device or the like operated on batteries in particular. Hence, a transflective type display device that can be used as the reflective type and also as the transmissive type is adapted to reflect external light entering through a display screen by a semi-reflective film provided therein while controlling the quantity of light outgoing from the display screen for each pixel by employing an optical element such as a liquid crystal or a polarized light separator disposed on an optical path thereof whereby to perform reflective display mainly for a bright place. On the other hand, mainly for a dark place, the transflective type display device is adapted to apply light source light by employing a built-in light source such as a backlight from the rear side of the foregoing semi-reflective film while controlling the quantity of light outgoing from the display screen for each pixel by employing an optical element such as a liquid crystal or a polarized light separator thereby to perform transmissive display.

A conventional liquid crystal display device that utilizes a variable transmission polarization axis optical element such as a TN (Twisted Nematic) liquid crystal, STN (Super-Twisted Nematic) liquid crystal or the like in which the polarization axis of transmitted light is rotated employs a structure wherein the variable transmission polarization axis optical element is sandwiched between two polarizers. The polarizers, which is an example of a polarized light separator, effects polarization by absorbing polarized light components in a different direction from that of a particular polarization axis direction from incident light, leading to a poor utilization factor of light. Especially in the case of the liquid crystal display device that can be used as the reflective type and also as the transmissive type described above, since light is reflected by the semi-reflective film for the reflective display, the utilization factor of light is worse. This poses a problem of dark display when the reflective display is carried out.

Referring to FIG. 33, a conventional transflective type display device employing a TN liquid crystal panel as the variable transmission polarization axis means will be described. FIG. 33 is a sectional view showing the conventional transflective type display device.

In FIG. 33, the display device is provided with an upper polarizer 205, an upper glass substrate 206, a TN liquid crystal layer that includes a voltage applied region 207 and a voltage non-applied region 208, a lower glass plate 209, a lower polarizer 210, a transflective plate 211, and a light source 212. As the transflective plate 211, an Al (aluminum) plate formed to be thin, for example, is used. Alternatively, the transflective plate 211 may be configured by providing a reflective plate with an opening. In FIG. 33, the respective components are shown as if they were separated for the sake of clarity; however, they are actually disposed in close contact to each other. Further, it is assumed that the upper polarizer 205 and the lower polarizer 210 are arranged such that the transmissive polarization axes are mutually orthogonalized to effect display in a normally white mode.

First, white display in the reflective display will be discussed. A light indicated on an optical path 201 is converted by the upper polarizer 205 into a linearly polarized light, which is directed parallel to a paper surface, twisted by 90 degrees in the direction of polarization in the voltage non-applied region 208 of the TN liquid crystal layer into a linearly polarized light perpendicular to the paper surface, transmitted as the linearly polarized light perpendicular to the paper surface through the lower polarizer 210, and reflected by the transflective plate 211, a part thereof being transmitted. The reflected light is transmitted again through the lower polarizer 210 as the linearly polarized light perpendicular to the paper surface, and twisted in the voltage non-applied region 208 of the TN liquid crystal layer by 90 degrees in the direction of polarization to become a linearly polarized light parallel to the paper surface, then it exits the upper polarizer 205. Thus, the white display is effected when no voltage is applied. In contrast to this, a light indicated by an optical path 203 is converted by the upper polarizer 205 into a linearly polarized light ray parallel to the paper surface, transmitted as the linearly polarized light parallel to the paper surface without being changed in the direction of polarization in the voltage applied region 207 of the TN liquid crystal layer, and absorbed by the lower polarizer 210, thus effecting black display.

The white display and the black display in the case of a transmissive display operation will now be described. A part of a light that is emitted from a light source 212 and that is indicated on an optical path 202 is transmitted through a transflective plate 211, converted on the lower polarizer 210 into a linearly polarized light perpendicular to the paper surface, twisted by 90 degrees in the direction of polarization in the voltage non-applied region of the TN liquid crystal layer to become a linearly polarized light parallel to the paper surface, and transmitted through the upper polarizer 205 as the linearly polarized light parallel to the paper surface, thus effecting the white display. In contrast to this, a part of a light that is emitted from the light source 212 and indicated on an optical path 204 is transmitted through the transflective plate 211, converted by the lower polarizer 210 into a linearly polarized light perpendicular to the paper surface, transmitted without being changed in the direction of polarization in the voltage applied region 207 of the TN liquid crystal layer, and absorbed by the upper polarizer 205, thus effecting black display.

As set forth above, the upper polarizer 205 and the lower polarizer 210 are both polarized light separators that involve the absorption; therefore, especially in the case of the reflective display, the light is partly absorbed when it is transmitted twice through the upper polarizer 205 and the lower polarizer 210. Furthermore, some of the light is transmitted through the transflective plate 211 to the light source 212 side and therefore not used for the display. As a result, the conventional transflective type liquid crystal display device has been posing a problem of a poor light utilization factor that causes a dark display screen especially in the case of the reflective display mode.

To solve the aforesaid problem, in Japanese Patent Application No. 8-245346 that was not yet laid open to the public on the priority date of the application concerned, we have proposed a transflective type display device that employs a reflective polarizer, which is an example of a polarized light separator for reflecting the light of a linearly polarized light component in a predetermined direction and for transmitting the light of a linearly polarized light component in the direction orthogonal thereto, in place of the lower polarizer and the transflective plate on the light source side. According to the display device, the reflection efficiency is enhanced by the polarized light separator, enabling brighter display to be achieved. Further, display devices employing reflective polarizers have been disclosed in Published Japanese Translations of Japanese Unexamined Patent Publication No. 9-506985 (Published International Application: WO/95/17692) and Published International Application No. WO/95/27819.

The transflective type display device employing the reflective polarizer that we have proposed in Japanese Patent Application No. 8-245346 will be described in conjunction with FIG. 1.

In FIG. 1, the display device is equipped with an upper polarizer 301, an upper glass substrate 302, a lower glass substrate 304, a reflective polarizer 306, a semi-transmissive light absorption layer 307, and a light source 308. The display device is further equipped with a TN liquid crystal layer sandwiched between the upper glass substrate 302 and the lower glass substrate 304, the TN liquid crystal layer including a voltage non-applied region 605 and a voltage applied region 606.

First, the white display and the black display in the reflective display mode will be discussed. A light that comes from outside the display device and that is indicated on an optical path 601 is converted by the upper polarizer 301 into a linearly polarized light parallel to a paper surface, twisted by 90 degrees in its direction of polarization in the voltage non-applied region 605 of the TN liquid crystal layer to become a light of a linearly polarized light component perpendicular to the paper surface, reflected by the reflective polarizer 306 as the linearly polarized light perpendicular to the paper surface, twisted again in the voltage non-applied region 605 of the TN liquid crystal layer by 90 degrees in its direction of polarization and becomes a light of the linearly polarized light component parallel to the paper surface, and escapes through the upper polarizer 301. Hence, when no voltage is applied to the TN liquid crystal layer, the white display is provided. Thus, the light in the white display is the light reflected by the reflective polarizer 306 that selectively reflects most of the light of the linearly polarized light transmitted through the upper polarizer 301; hence, the display is brighter than the one provided by the conventional display device (refer to FIG. 33) which employs the transflective plate that merely partially reflects the light transmitted through the polarizer as previously discussed. In contrast to this, a light indicated on an optical path 603 is converted on the upper polarizer 301 into a linearly polarized light parallel to the paper surface, transmitted as the linearly polarized light parallel to the paper surface without being changed in the direction of polarization in the voltage applied region 606 of the TN liquid crystal layer, further transmitted without being changed in the direction of polarization on the reflective polarizer 306, then absorbed by the semi-transmissive light absorption layer 307, thus providing the black display.

The white display and the black display in the transmissive display mode will now be discussed. A light from the light source 308 that is indicated on an optical path 602 is transmitted through an opening provided in the semi-transmissive light absorption layer 307, converted by the reflective polarizer 306 into a linearly polarized light parallel to the paper surface (i.e. the polarized light component perpendicular to the paper surface is reflected by the bottom surface of the reflective polarizer 306 and absorbed by the semi-transmissive light absorption layer 307), twisted by 90 degrees in the direction of polarization in the voltage non-applied region 605 of the TN liquid crystal layer so as to become a linearly polarized light perpendicular to the paper surface, and absorbed by the upper polarizer 301, thus providing the black display. As opposed to this, a light from the light source 308 that is indicated on an optical path 604 is transmitted through the opening provided in the semi-transmissive light absorption layer 307, converted by the reflective polarizer 306 into a linearly polarized light parallel to the paper surface, and transmitted through the upper polarizer plate 301 as the linearly polarized light parallel to the paper surface without changing the direction of polarization even in the voltage applied region 606 of the TN liquid crystal layer, thus providing the white display.

Thus, the transflective type display device that we have proposed in Japanese Patent Application No. 8-245346 and that employs the reflective polarizer as the polarized light separator is able to provide brighter reflective display by external light than that available with the conventional art mainly in a bright place and also to provide transmissive display dependent upon the light from a light source mainly in a dark place.

SUMMARY OF THE INVENTION

As discussed in conjunction with FIG. 1, however, the transflective type display device employing the reflective polarizer as the polarized light separator uses the light reflected by the reflective polarizer for performing display in the transmissive display mode, while it uses the light transmitted through the reflective polarizer for performing display in the reflective display mode. Therefore, the portions where a voltage is applied to the liquid crystal panel (where the direction of polarization is not twisted in the TN liquid crystal) present the white display known as "negative display" in the transmissive display mode, whereas the portions where no voltage is applied to the liquid crystal panel (where the direction of polarization is twisted 90 degrees in the TN liquid crystal) present the white display known as "positive display" In the reflective display mode. In other words, in the reflective display mode, the white and black display is reversed in comparison with the transmissive display mode. Thus, the display device that we have proposed in Japanese Patent Application No. 8-245346 has been posing a problem in which "positive-negative inversion" takes place if the same liquid crystal applied voltage is provided in the transmissive display mode and the reflective display mode.

Specifically, the positive-negative inversion display is relatively suited for the black-and-white display or dichroic display for primarily displaying characters or numerals because the difference is sufficiently small to enable the recognition of characters or numerals in the positive display and the negative display; it is not suited, however, for full-color display because the displayed colors in the negative display mode are far from actual colors.

Further, the external light serving as the display light passes twice through the optical elements including a polarizer, a liquid crystal panel, a reflective polarizer, and a color filter or the like in a round trip in the reflective display mode, while the light from a light source serving as the display light passes through the above optical elements only once in the transmissive display mode. This generally causes some difference in the light intensity on a display screen. For this reason, there has been another problem in that achieving stable display luminance in both transmissive display mode and the reflective display mode, that is, achieving approximately the same display brightness in both modes, is even more difficult than simply solving the problem of the positive-negative inversion.

The present invention has been made with a view toward solving the aforesaid problems, and it is an object thereof to provide: a transflective type display device which utilizes a variable transmission polarization axis optical element such as a liquid crystal, which does not develop positive-negative inversion upon the switching between reflective display mode dependent on external light and transmissive display mode dependent upon a light source turned ON, which is capable of providing approximately the same display luminance in the reflective display mode and the transmissive display mode, and which is also capable of providing bright display; a driving method for the same; and electronic equipment employing the same.

To this end, according to the present invention, there is provided a display device equipped with: variable transmission polarization axis means capable of varying a transmission polarization axis; first polarized light separating means which is disposed on one side of the variable transmission polarization axis means and which permits a light of a linearly polarized light component in a first direction to be transmitted while it reflects or absorbs a light of a linearly polarized light component in a predetermined direction different from the first direction; second polarized light separating means which is disposed on the other side of the variable transmission polarization axis means and which permits a light of a linearly polarized light component in a second direction to be transmitted while it reflects a light of a linearly polarized light component in a predetermined direction different from the second direction; a light source which is disposed on the opposite side from the variable transmission polarization axis means relative to the second polarized light separating means and which emits light to the variable transmission polarization axis means via the second polarized light separating means; ON/OFF controlling means for controlling the turning ON/OFF of the light source; driving means for driving the variable transmission polarization axis means according to image data to change the transmission polarization axis; and driving characteristic switching means for switching the changing characteristic of the transmission polarization axis with respect to the image data in the driving means in accordance with the ON/OFF of the light source.

In the display device in accordance with the present invention, when the reflective display is effected by utilizing external light, the light source is placed in an OFF state by the ON/OFF controlling means, and external light is entered from the first polarized light separating means. The first polarized light separating means transmits the light of the linearly polarized light components in the first direction among the incident external light to the variable transmission polarization axis means side. And the first polarized light separating means reflects or absorbs linearly polarized light components in the predetermined direction different from the first direction (e.g. a direction orthogonal or nearly orthogonal to the first direction). Then, the second polarized light separating means transmits the light of the linearly polarized light components in the second direction among the light entered via the first polarized light separating means and the variable transmission polarization axis means to the side opposite from the variable transmission polarization axis means and reflects the light of linearly polarized light components in the predetermined direction different from the second direction (e.g. a direction orthogonal or nearly orthogonal to the second direction). The light transmitted through the second polarized light separating means is reflected or diffused at the light source portion that is in an OFF state. On the other hand, the light reflected by the second polarized light separating means passes through the variable transmission polarization axis means and the first polarized light separating means in the reverse order from the above order.

As a result, in the case of the reflective display, a first display state and a second display state set forth below are obtained: in a first display state (relatively bright), the light selectively reflected by the second polarized light separating means according to the direction of the transmission axis in the variable transmission polarization axis means exits the first polarized light separating means side via the variable transmission polarization axis means, and in a second display state (relatively dark), the light transmitted through the second polarized light separating means does not exit the first polarized light separating means side because it is primarily absorbed or diffused. A halftone display can be obtained by appropriately adjusting the polarization axis of the light between the first and second polarized light separating means by the variable transmission polarization axis means and by adjusting the intensity of the light finally exiting the first polarized light separating means. At this time, regarding the brightness in the reflective display, the polarization and separation is carried out by the reflection of light rather than the absorption of light and the reflected linearly polarized light components are utilized as display light; hence, brighter reflective display can be obtained in comparison with the conventional case where the polarizer is employed as the second polarized light separating means.

On the other hand, in the case where the transmissive display uses a light source, the light source is placed in the ON state by the ON/OFF controlling means, and the light of the light source is applied from the light source to the second polarized light separating means. The second polarized light separating means transmits the light of the linearly polarized light components in the second direction among the incident light of the light source to the variable transmission polarization axis means side, while it reflects the light of the linearly polarized light component in the predetermined direction different from the second direction. Further, the first polarized light separating means transmits the light of the linearly polarized light component in the first direction among the light entered via the second polarized light separating means and the variable transmission polarization axis means to the opposite side from the variable transmission polarization axis means, i.e., to the display screen side. And the first polarized light separating means reflects the linearly polarized light component in the predetermined direction different from the first direction.

As a result, in the case of the transmissive display, a third display state and a fourth display state as set forth below are obtained: in the third display state (relatively bright), the light selectively transmitted through the second polarized light separating means according to the direction of the transmission axis in the variable transmission polarization axis means exits the first polarized light separating means side, and in the fourth display state (relatively dark), the light emitted from the light source is reflected by the first polarized light separating means. A halftone display can be obtained by appropriately adjusting the polarization axis of the light between the first and second polarized light separating means by the variable transmission polarization axis means and by adjusting the intensity of the light finally exiting the first polarized light separating means.

Thus, when effecting the reflective display and the transmissive display, the variable transmission polarization axis means is driven by the driving means in accordance with image data to change the transmission polarization axis; hence, an image based on the image data according to the first or second display state in the reflective display mode or the third or fourth display state in transmissive display mode is shown on the display device. In this case, if the same changing characteristic of the transmission polarization axis relative to image data in the driving means were set for both reflective display and transmissive display, then the area to be placed in the first display state (bright) in the reflective display mode would be placed in the fourth display state (dark) in the transmissive display mode, while the area to be placed in the second display state (dark) in the reflective display mode would be placed in the third display state (bright) in the transmissive display mode for the same image data as in the case of the device disclosed in Japanese Patent Application No. 8-245346 previously discussed. This means that the positive-negative inversion takes place upon the switching between the reflective display mode and the transmissive display mode.

The changing characteristic of the transmission polarization axis relative to image data means how to change the transmission polarization axis in relation to the changes in image data. For instance, there are such changing characteristics as the one wherein, if image data is binary data indicative of white or black, then the transmission polarization axis is changed such that the direction of polarization is twisted 90 degrees, 270 degrees, or other degrees for the image data indicative of white, while the direction of polarization is not twisted for the image data indicative of black. Conversely, in another changing characteristic, the transmission polarization axis is changed such that the direction of polarization is not twisted for the image data indicative of black, while the direction of polarization is twisted for the image data indicative of white. For the image data indicative of multiple-step gray scale from white to black, there is available a changing characteristic wherein the transmission polarization axis is changed such that the twisting in the direction of polarization is gradually decreased from white toward black, or another changing characteristic wherein the transmission polarization axis is changed to gradually increase the twisting of the direction of polarization from white toward black.

According to the present invention, when the turning ON and OFF of the light source is controlled by the ON/OFF controlling means, the changing characteristic of the transmission polarization axis for image data in the driving means as described above is switched by the driving characteristic switching means in accordance with the ON or OFF of the light source.

Thus, by setting beforehand the changing characteristic for the reflective display mode and the changing characteristic for the transmissive display mode, respectively, that do not develop the positive-negative inversion as the changing characteristics of the transmission polarization axis for image data, it becomes possible to avoid the occurrence of the positive-negative inversion upon the switching between the reflective display mode and the transmissive display mode by switching between these changing characteristics in accordance with the foregoing ON and OFF in performing actual display.

Further, by switching the changing characteristic of the transmission polarization axis, it becomes also possible to compensate for the difference in the intensity of light between the reflective display mode and the transmissive display mode attributable to the difference in optical path between the external light serving as the display light for the reflective display mode and the light source light serving as the display light for the transmissive display mode. This means that it is possible to provide approximately the same intensity of light in both the reflective display mode and the transmissive display mode. Especially if image data is n-value (n: an integer of 3 or more) data indicative of multiple-step gray scale rather than black-and-white binary data, by setting in advance the changing characteristics for the reflective display mode and the transmissive display mode, respectively so that the intensity of light of the display light (display luminance) in the reflective display mode and the intensity of light of the display light (display luminance) in the transmissive display mode are the same or nearly the same for all steps of gray scale, it becomes possible to obtain the same or nearly the same intensity of light for all steps of gray scale between the reflective display mode and the transmissive display mode by switching between these changing characteristics according to the ON and OFF in performing actual display. To be more specific, by setting the reflectance at each step of gray scale in the reflective display mode at the same or nearly the same intensity of light (display luminance) at each step of gray scale in accordance with the transmittance for each step of gray scale in the transmissive display mode, it becomes possible to set the same or nearly the same intensity of light for all halftone steps in addition to white and black in both transmissive display mode and the reflective display mode. Hence, even in the case of multiple-step gray scale or color image data, high-fidelity, high-definition image display can be achieved. For example, natural, smooth reflective display and transmissive display can be accomplished even for natural images or full-color images.

As set forth above, the display device in accordance with the present invention is able to avoid the positive-negative inversion upon the switching between the reflective display mode and the transmissive display mode and to achieve nearly the same intensity of light (display luminance) in both reflective display mode and transmissive display mode, thus providing bright, high-definition image display. Various specific forms of the method for switching the changing characteristic of the transmission polarization axis in relation to image data are possible, some of them being shown below.

In a preferred form of the display device in accordance with the present invention, the variable transmission polarization axis means is constituted by a liquid crystal panel having a liquid crystal sandwiched between a pair of substrates, and the driving means applies a driving voltage based on the image data to the liquid crystal. In other words, the display device is configured as a liquid crystal device.

With this arrangement, the driving means applies a drive voltage in accordance with image data to the liquid crystal to change the transmission polarization axis in the liquid crystal panel. At this time, when the ON/OFF of the light source is controlled by the ON/OFF controlling means, the changing characteristic of the transmission polarization axis in relation to the image data in the driving means is switched by the driving characteristic switching means in accordance with ON/OFF of the light source. Therefore, in this liquid crystal device, the positive and negative are not inverted when switching between the reflective display mode and the transmissive display mode, and approximately the same intensity of light can be obtained for both reflective display mode and transmissive display mode, enabling bright display to be accomplished.

In this form, the liquid crystal may be composed of any one of TN (Twisted Nematic) liquid crystal, STN (Super-Twisted Nematic) liquid crystal, F-STN (Film compensated Super-Twisted Nematic) liquid crystal, and ECB (Electrically Controlled Birefringence) liquid crystal. With this arrangement, bright, high-definition reflective display can be performed relatively easily without positive-negative inversion. The STN liquid crystal element includes an STN liquid crystal element that employs an optical anisotropic substance for color compensation. Use of an ECB liquid crystal element or other type of liquid crystal element having birefringence effect makes it possible to change the color development from a light source.

In another preferred form of the invention wherein the variable transmission polarization axis means is composed of a liquid crystal panel, the driving characteristic switching means may switch the driving voltage in synchronization with an ON/OFF control signal instructing the ON/OFF controlling means to turn ON/OFF the light source.

With this arrangement, the turning ON/OFF of the light source can be controlled by the ON/OFF controlling means in accordance with the ON/OFF control signal directing the turning ON/OFF of the light source. And in synchronization with the ON/OFF control signal, the driving voltage is switched by the driving characteristic switching means thereby to switch the changing characteristic of the transmission polarization axis of the liquid crystal panel in relation to image data. As a result, the moment the switching is made between the reflective display mode and the transmissive display mode, the driving voltage of the liquid crystal panel is accordingly switched, so that there is hardly or no time for the positive-negative inversion to occur. In other words, a reliable, convenient function for preventing the positive-negative inversion can be realized. As an alternative, the driving voltage of the liquid crystal panel may be switched in synchronization with an ON/OFF detection signal generated by optically or electrically detecting ON/OFF in place of using such an ON/OFF control signal.

In a further preferred form wherein the driving voltage is switched in synchronization with the ON/OFF control signal, the liquid crystal panel is is constituted by a dot matrix liquid crystal panel which is provided with a plurality of data signal lines and a plurality of scanning signal lines and which is able to change the transmission polarization axis by driving the liquid crystal in each driving region formed for each intersection of the plurality of data signal lines and the plurality of scanning signal lines, and the driving characteristic switching means may switch the potentials of data signals supplied to the data signal lines according to the image data in synchronization with the ON/OFF control signal.

With this arrangement, the potentials of the data signals are switched by the driving characteristic switching means in synchronization with the ON/OFF control signal thereby to switch the changing characteristic of the transmission polarization axis of the liquid crystal panel in relation to image data. As a result, also in the dot matrix liquid crystal panel, the moment the switching between the reflective display mode and the transmissive display mode is done, the driving voltage is switched, preventing the inversion between positive and negative from taking place.

In the form wherein the potential of a data signal is switched, the driving means may include a data signal potential supplying means that supplies the potential of the data signal to the liquid crystal panel, and the driving characteristic switching means may include, in a stage preceding the data signal potential supplying means, a data signal converting means for switching the data signal, which is supplied to the data signal potential supplying means in accordance with the image data, to a data signal corresponding to positive display and a data signal corresponding to negative display in synchronization with the ON/OFF control signal.

With this arrangement, in the stage preceding the data signal potential supplying means, data signals can be switched by the data signal converting means into data signals corresponding to positive display and data signals corresponding to negative display in synchronization with the ON/OFF control signal. Hence, the changing characteristic of the transmission polarization axis of the liquid crystal panel can be changed according to image data in the stage of data signals by changing the contents of the data, thus making it possible to prevent the positive-negative inversion relatively easily and reliably.

In the form wherein the data signals are switched by the data signal converting means, the data signal converting means may include an inverting means for inverting the data signal in synchronization with the ON/OFF control signal.

With this arrangement, the changing characteristic of the transmission polarization axis of the liquid crystal panel can be switched according to image data by inverting the data signal by the inverting means; therefore, the positive-negative inversion can be prevented extremely easily and reliably.

In another preferred form of the display device in accordance with the present invention, the second polarized light separating means is composed of a reflective polarizer that allows light of a linearly polarized light component in the second direction to be transmitted and reflects light of a linearly polarized light component in the direction orthogonal to the second direction.

With this arrangement, the reflective polarizer allows the linearly polarized light component in the second direction in the incident light to be transmitted as the linearly polarized light component in the second direction. And the reflective polarizer reflects the linearly polarized light component in the direction orthogonal to the second direction as the linearly polarized light component in the direction orthogonal to the second direction. Hence, display can be performed according to the light transmitted through the reflective polarizer, and the utilization factor of light can be improved over the case wherein light is absorbed to be subjected to polarization and separation by a polarizer as in the conventional example, thus achieving brighter display especially in the reflective display mode.

In this form, the reflective polarizer may be constructed of a laminate composed of first layers having birefringence and second layers that have a refractive index substantially equal to one of a plurality of refractive indexes of the first layers and that has no birefringence, the first and second layers being stacked alternately.

In the reflective polarizer having such a configuration, the linearly polarized light components in the second direction among the light entered from the depositing direction relative to one principal plane of the reflective polarizer are transmitted to the other principal plane side on the opposite side as the linearly polarized light components in the second direction. And the light of the linearly polarized light components in the direction orthogonal to the second direction are reflected as the light of the linearly polarized light components in the direction orthogonal to the second direction. Further, the light of the linearly polarized light components in the second direction among the light entered from the depositing direction relative to the other principal plane of the reflective polarizer are transmitted to one principal plane side on the opposite side as the linearly polarized light components in the second direction. And the light of the linearly polarized light components in the direction orthogonal to the second direction are reflected as the light of the linearly polarized light components in the direction orthogonal to the second direction.

In a further preferred form of the display device in accordance with the present invention, the second polarized light separating means allows the linearly polarized light components in the second direction to be transmitted with respect to the light in the almost entire wavelength range of a visible light region and it reflects the light of the linearly polarized light components in the direction orthogonal to the second direction.

According to this form, in the reflective display mode, two display states are obtained for the external light in the almost entire wavelength range of the visible light region in accordance with the direction of the transmission polarization axis in the variable transmission polarization axis means, display based on transparent reflection or white reflection being obtained in one of the two display states. On the other hand, when a white light source is employed in the transmissive display mode, two display states are obtained for light of a light source in the almost entire wavelength range of the visible light region in accordance with the direction of the transmission polarization axis in the variable transmission polarization axis means, display based on transparent reflection or white reflection being obtained in one of the two display states.

In a further preferred form of the display device in accordance with the present invention, the first polarized light separating means is composed of a polarizer that allows the light of the linearly polarized light components in the first direction to be transmitted and that absorbs the light of the linearly polarized light components in the direction orthogonal to the first direction.

With this arrangement, the polarizer allows the linearly polarized light components in the first direction among the incident light to be transmitted as the linearly polarized light components in the first direction, while it absorbs the linearly polarized light components in the direction orthogonal to the first direction. Hence, the display can be carried out according to the light transmitted through the polarizer, enabling the reflection of external light on a display surface to be reduced.

Another preferred form of the display device in accordance with the present invention is further provided with a semi-transmissive light absorption layer located between the second polarized light separating means and the light source.

With this arrangement, in the reflective display mode, the light transmitted through the second polarized light separating means via the variable transmission polarization axis means is partly absorbed by the semi-transmissive light absorption layer, and the light that has been transmitted through the semi-transmissive light absorption layer is reflected or diffused by the surface of a light source in an OFF state before being further absorbed by the semi-transmissive light absorption layer; therefore, the light is hardly or never emitted from the first polarized light separating means via the second polarized light separating means and the variable transmission polarization axis means. This permits darker display, leading to improved contrast. Further, in the transmissive display. mode, the semi-transmissive light absorption layer allows the light from a light source in the ON state to be partly transmitted, thus enabling the transmissive display.

In this form, the transmittance of the semi-transmissive light absorption layer may range from 5% to 80%.

With this arrangement, proper balance between brightness and contrast can be accomplished in the reflective display mode and the transmissive display mode.

Yet another preferred form of the display device in accordance with the present invention is further provided with a polarizing means that has its transmission axis nearly aligned with the second direction and that is located between the second polarized light separating means and the light source.

According to this form, in the transmissive display mode, the light of the linearly polarized light components in a predetermined direction, which is different from the second direction (e.g. a direction orthogonal to the second direction), among the light from the light source are transmitted through the polarizing means and the second polarized light separating means. At this time, the polarizing means works to make up for the degree of polarization in the second polarized light separating means, so that the contrast in the transmissive display mode is improved. Alternatively, an inexpensive second polarized light separating means that has a relatively lower degree of polarization may be used.

In the form wherein the potentials of data signals can be switched, a nonlinear element for each intersection may be further provided.

With this arrangement, by using a nonlinear element such as TFT or TFD, a display device equipped with a large dot matrix liquid crystal panel of an active matrix driving system that permits high-definition image display can be realized.

In still another form of the display device in accordance with the present invention, a transmissive light diffusion layer is further provided between the light source and the second polarized light separating means.

With this arrangement, the light that is transmitted through the variable transmission polarization axis means and the first polarized light separating means and that is emitted as display light enables the display that is not in a mirror surface state (in a paper state). The light diffusion layer may be disposed, for example, between the first polarized light separating means and the variable transmission polarization axis means or between the variable transmission polarization axis means and the second polarized light separating means.

In the foregoing form wherein the variable transmission polarization axis means is composed of the liquid crystal panel, one of the paired substrates may be further equipped with a color filter.

With this arrangement, a transflective type display device that permits color display such as dichroic display other than black-and-white display or full color display can be achieved.

In the foregoing form wherein the variable transmission polarization axis means is composed of the liquid crystal panel, the liquid crystal panel is formed of a dot matrix liquid crystal panel that is provided with a plurality of data signal lines and a plurality of scanning signal lines and that is able to change the transmission polarization axis by driving the liquid crystal in the respective driving regions formed at the respective intersections of the plurality of data signal lines and the plurality of scanning signal lines. The driving means includes a scanning signal supplying means for supplying the scanning signals and a data signal supplying means for supplying the data signals. The driving voltage applied to the liquid crystal corresponding to each driving region mentioned above may be made different by the driving voltage switching means, depending on whether the light source is OFF or ON by controlling the voltage of at least one of the scanning signals and the data signals respectively supplied by the scanning signal supplying means and the data signal supplying means.

With this arrangement, by setting in advance the driving voltage so that the reflectance in each gray scale is the same or approximately the same in each driving region (dot) in both transmissive display mode and reflective display mode, the intensity of light over an entire screen can be made the same or approximately the same in both transmissive display mode and reflective display mode by selectively applying either one of these different driving voltages to the liquid crystal of each driving region depending on whether the light source is ON or OFF when effecting actual transmissive display and reflective display.

In the preferred form, the driving voltage switching means may further include a scanning signal potential controlling means that makes the potential of the scanning signal supplied by the scanning signal supplying means when the light source is OFF different from the potential of the scanning signal supplied when the light source is ON.

With this arrangement, by setting in advance the potential of the scanning signal for the reflective display and the potential of the scanning signal for the transmissive display so that the intensity of light (display luminance) of each gray scale is the same or approximately the same in both transmissive display mode and reflective display mode, the intensity of light can be made the same or approximately the same in both transmissive display mode and reflective display mode by selectively supplying either of the scanning signals of the different potentials depending on whether the light source is ON or OFF in performing actual transmissive display and reflective display.

Further in this form, the scanning signal potential controlling means may include a first common potential output unit that outputs a predetermined potential and a first converted potential output unit that outputs a potential based on an ON/OFF control signal instructing the ON/OFF controlling means to turn ON/OFF the light source, and may be configured such that the scanning signal potential controlling means outputs the sum of the potentials supplied from the first common potential output unit and the first converted potential output unit to the scanning signal supplying means.

With this arrangement, it is possible to reduce power consumption and simplify the circuit configuration and to reliably provide the same or approximately the same intensity of light in the transmissive display mode and the reflective display mode.

In the aforesaid form wherein the voltage of at least either the scanning signal or the data signal is controlled, the driving voltage switching means may be constructed to include a data signal potential controlling means that makes setting so that the potential of the data signal supplied by the data signal supplying means when the light source is OFF is different from the potential of the data signal supplied when the light source is ON.

With this arrangement, by setting in advance the potential of the data signal for the reflective display and the potential of the data signal for the transmissive display so that the intensity of light (display luminance) of each gray scale step is the same or approximately the same in both transmissive display mode and reflective display mode, the intensity of light can be made the same or approximately the same in both transmissive display mode and reflective display mode by selectively supplying either one of the data signals of the different potentials depending on whether the light source is ON or OFF when performing actual transmissive display and reflective display.

Further in this form, the data signal potential controlling means may include an image signal repeater that outputs a potential corresponding to the image data, a second common potential output unit that outputs a predetermined potential, and a second converted potential output unit that outputs a potential based on the ON/OFF control signal instructing the ON/OFF controlling means to turn ON/OFF the light source, and may be configured such that the data signal potential controlling means outputs the sum of the potentials output from the image signal repeater, the second common potential output unit, and the second converted potential output unit to the data signal supplying means.

With this arrangement, it is possible to reduce power consumption and simplify the circuit configuration and to reliably provide the same or approximately the same intensity of light in the transmissive display mode and the reflective display mode.

In the foregoing form that includes the data signal potential controlling means, the data signal potential controlling means may include an image signal converting unit that converts an image signal corresponding to the image data and outputs the potential of the converted image signal, a third common potential output unit that outputs a predetermined potential, and a gray scale controlling unit that outputs a potential based on an ON/OFF control signal instructing the ON/OFF controlling means to turn ON/OFF the light source and the gray scale information of the image data. The data signal potential controlling means may be configured such that it outputs the sum of the potentials output from the image signal converting unit, the third common potential output unit, and the gray scale controlling unit to the data signal supplying means.

With this arrangement, it is possible to reduce power consumption and simplify the circuit configuration and to reliably provide the same or approximately the same intensity of light in the transmissive display mode and the reflective display mode.

The aforesaid object of the present invention is fulfilled also by electronic equipment provided with the display device in accordance with the present invention described above.

The electronic equipment in accordance with the present invention is provided with the display devices in accordance with the present invention as set forth above, thus making it possible to realize a variety of electronic equipment such as portable information equipment, a personal computer, a navigation system or the like that are capable of providing bright display without the inversion of positive and negative when switching between the reflective display mode and the transmissive display mode. The electronic equipment in accordance with the present invention may be equipped with any one of the display devices in the various forms set forth above depending on its application.

The foregoing object of the present invention may be fulfilled also by a driving method of a display device provided with variable transmission polarization axis means capable of varying a transmission polarization axis, first polarized light separating means which is disposed on one side of the variable transmission polarization axis means and which permits a light of a linearly polarized light component in a first direction to be transmitted while it reflects or absorbs a light of a linearly polarized light component in a predetermined direction different from the first direction, second polarized light separating means which is disposed on the other side of the variable transmission polarization axis means and which permits a light of a linearly polarized light component in a second direction to be transmitted while it reflects a light of a linearly polarized light component in a predetermined direction different from the second direction, and a light source which is disposed on the opposite side from the variable transmission polarization axis means with respect to the second polarized light separating means and which emits light to the variable transmission polarization axis means via the second polarized light separating means, the driving method of a display device comprising: an ON/OFF controlling step for controlling the turning ON/OFF of the light source; a driving step for driving the variable transmission polarization axis means according to image data to change the transmission polarization axis; and a driving characteristic switching step for switching the changing characteristic of the transmission polarization axis relative to the image data in the driving step in accordance with the ON/OFF of the light source.

The driving method in accordance with the present invention makes it possible to avoid the positive-negative inversion upon the switching between the reflective display mode and the transmissive display mode and to achieve nearly the same intensity of light (luminance of display) in both reflective display mode and transmissive display mode, providing bright, high-definition image display as in the case of the display device in accordance with the present invention described above.

In a preferred form of the driving method of the display device in accordance with the present invention, the variable transmission polarization axis means is constituted by a liquid crystal panel having a liquid crystal sandwiched between a pair of substrates, and the driving step applies a drive voltage based on the image data to the liquid crystal.

With this arrangement, the driving voltage in accordance with image data is applied to the liquid crystal to change the transmission polarization axis in the liquid crystal panel. At this time, when the ON/OFF of the light source is controlled, the changing characteristic of the transmission polarization axis in relation to the image data in the driving step is switched in accordance with ON/OFF of the light source. Therefore, in this liquid crystal device, the positive and negative are not inverted upon the switching between the reflective display mode and the transmissive display mode, and approximately the same intensity of light can be obtained for both reflective display mode and transmissive display mode, enabling bright display to be accomplished.

Further in this form, the driving characteristic switching step may switch the driving voltage in synchronization with an ON/OFF control signal that instructs the turning ON/OFF of the light source in the ON/OFF controlling step.

With this arrangement, the turning ON/OFF of the light source can be controlled by the ON/OFF controlling step in accordance with the ON/OFF control signal directive of the turning ON/OFF of the light source. And in synchronization with the ON/OFF control signal, the driving voltage is switched so as to switch the changing characteristic of the transmission polarization axis of the liquid crystal panel relative to image data. As a result, upon the switching between the reflective display mode and the transmissive display mode, the driving voltage of the liquid crystal panel is accordingly switched, so that there is hardly or no time for the positive-negative inversion to occur.

Further in this form, the liquid crystal panel is composed of a dot matrix liquid crystal panel which is equipped with a plurality of data signal lines and a plurality of scanning signal lines, and in which the transmission polarization axis can be changed by driving the liquid crystals in respective driving regions formed for the respective intersections of the plurality of data signal lines and the plurality of scanning signal lines. The driving characteristic switching step may switch the potentials of data signals supplied to the data signal lines according to the image data in synchronization with the ON/OFF control signal.

With this arrangement, the potentials of the data signals are switched in synchronization with the ON/OFF control signal thereby to switch the changing characteristic of the transmission polarization axis of the liquid crystal panel relative to image data. As a result, also in the dot matrix liquid crystal panel, upon the switching between the reflective display mode and the transmissive display mode, the driving voltage is switched, thus preventing the inversion of positive and negative from taking place.

Further in this form, the driving step may include a data signal potential supplying step that supplies the potential of the data signal to the liquid crystal panel, and the driving characteristic switching step may include, prior to the data signal potential supplying step, a data signal converting step for switching the data signal supplied in accordance with the image data in the data signal potential supplying step to a data signal corresponding to positive display and a data signal corresponding to negative display in synchronization with the ON/OFF control signal.

With this arrangement, data signals can be switched by the data signal converting step into data signals corresponding to positive display and data signals corresponding to negative display in synchronization with the ON/OFF control signal. Hence, the changing characteristic of the transmission polarization axis of the liquid crystal panel can be switched according to image data in the stage of data signals by changing the contents of the data, thus making it possible to prevent the positive-negative inversion relatively easily and reliably.

Further in this form, the data signal converting step may include an inverting step for inverting the data signal in synchronization with the ON/OFF control signal.

With this arrangement, the changing characteristic of the transmission polarization axis of the liquid crystal panel can be switched according to image data by inverting the data signal by the inverting step; therefore, the positive-negative inversion can be prevented extremely easily and reliably.

In the foregoing form wherein the transmission polarization axis means is composed of the liquid crystal panel, the liquid crystal panel is formed of a dot matrix liquid crystal panel that is provided with a plurality of data signal lines and a plurality of scanning signal lines and that is able to change the transmission polarization axis by driving the liquid crystal in the respective driving regions formed at the respective intersections of the plurality of data signal lines and the plurality of scanning signal lines. The driving step includes a scanning signal supplying step for supplying the scanning signals and a data signal supplying step for supplying the data signals. The driving voltage switching step may set the driving voltage applied to the liquid crystal corresponding to each driver region mentioned above so that it is different depending on whether the light source is OFF or ON by controlling the voltage of at least one of the scanning signals and the data signals respectively supplied by the scanning signal supplying step and the data signal supplying step.

With this arrangement, by setting in advance the driving voltage so that the reflectance in each gray scale step is the same or approximately the same in each driving region (dot) in both transmissive display mode and reflective display mode, the intensity of light over an entire screen can be made the same or approximately the same in both transmissive display mode and reflective display mode.

In the preferred form, the driving voltage switching step may further include a scanning signal potential controlling step that makes setting so that the potential of the scanning signal supplied by the scanning signal supplying step when the light source is OFF is different from the potential of the scanning signal supplied when the light source is ON.

With this arrangement, by setting in advance the potential of the scanning signal for the reflective display and the potential of the scanning signal for the transmissive display so that the intensity of light (display luminance) of each gray scale step is the same or approximately the same in both transmissive display mode and reflective display mode, the intensity of light can be made the same or approximately the same in both transmissive display mode and reflective display mode.

In the aforesaid form wherein the voltage of at least either the scanning signal or the data signal is controlled, the driving voltage switching step may include a data signal potential controlling step that makes setting so that the potential of the data signal supplied by the data signal supplying step when the light source is OFF is different from the potential of the data signal supplied when the light source is ON.

With this arrangement, by setting in advance the potential of the data signal for the reflective display and the potential of the data signal for the transmissive display so that the intensity of light (display luminance) of each gray scale step is the same or approximately the same in both transmissive display mode and reflective display mode, the intensity of light can be made the same or approximately the same in both transmissive display mode and reflective display mode.

The display devices in accordance with the present invention described above are able to achieve the display free of the positive-negative inversion upon the switching between the reflection mode and the transmission mode while realizing brighter reflective display even when they are constructed as display devices of any of the publicly known driving systems such as the simple (passive) matrix system or the active matrix system or the segment system that employ TFTs (Thin Film Transistors) or TFDs (Thin Film Diodes).

Furthermore, as the polarized light separating means in accordance with the present invention, other type than the foregoing reflective polarizer may be used, some examples being a combination of a cholesteric liquid crystal layer and a (¼) λ plate, one adapted for separation into reflected polarized light and transmitted polarized light by making use of Brewster's angle (page 427 through page 429, S1D 92 D1GEST), one making use of hologram, and the ones disclosed in the international application laid open (published International Applications,: No. WO95/27819 and No. WO95/17692). The diverse types of polarized light separator can be used in place of the reflective polarizer in the same manner in the embodiments to be discussed hereafter.

BRIEF DESCRIPTION OF THE DRAWINGS

FIG. 9 is a circuit diagram showing an ON/OFF controlling means mounted on the display device of the first embodiment in accordance with the present invention.

FIG. 10 is a circuit diagram showing a data signal converting means mounted on the display device of the first embodiment in accordance with the present invention.

FIG. 11 shows a truth table in the data signal converting means mounted on the display device of the first embodiment in accordance with the present invention.

FIG. 28 is a table showing the display data, applied voltage, and optical reflectance in a reflective display mode relative to image data in the display device of the seventh embodiment in accordance with the present invention.

FIG. 29 is a table showing the display data, applied voltage, and optical reflectance in a transmissive display mode with respect to image data in the display device of the seventh embodiment in accordance with the present invention.

BEST MODES FOR CARRYING OUT THE INVENTION

The following will describe the best modes for carrying out the present invention in the form of embodiments with reference with the accompanying drawings.

(Polarized Light Separator)

Figure 2:
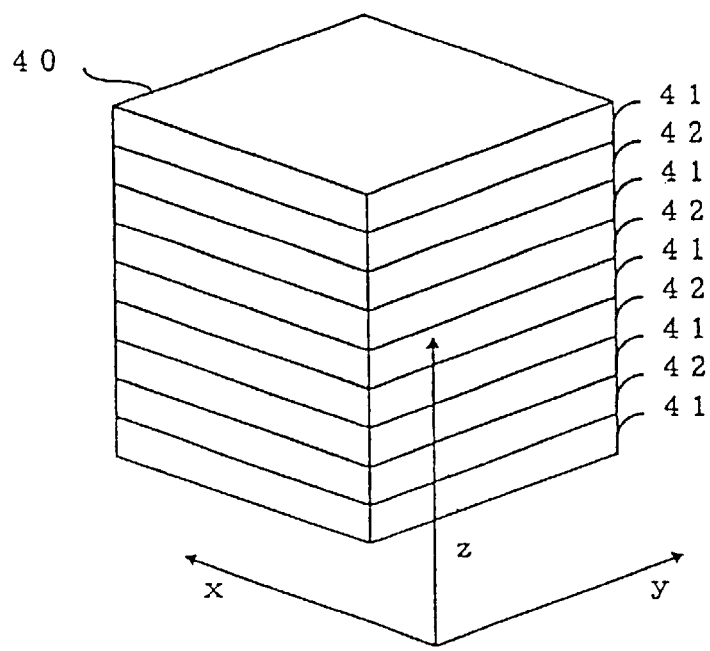
FIG. 2 is a schematic perspective view showing a polarized light separator (reflective polarizer) employed for the display device of each embodiment in accordance with the present invention.
Figure 3:
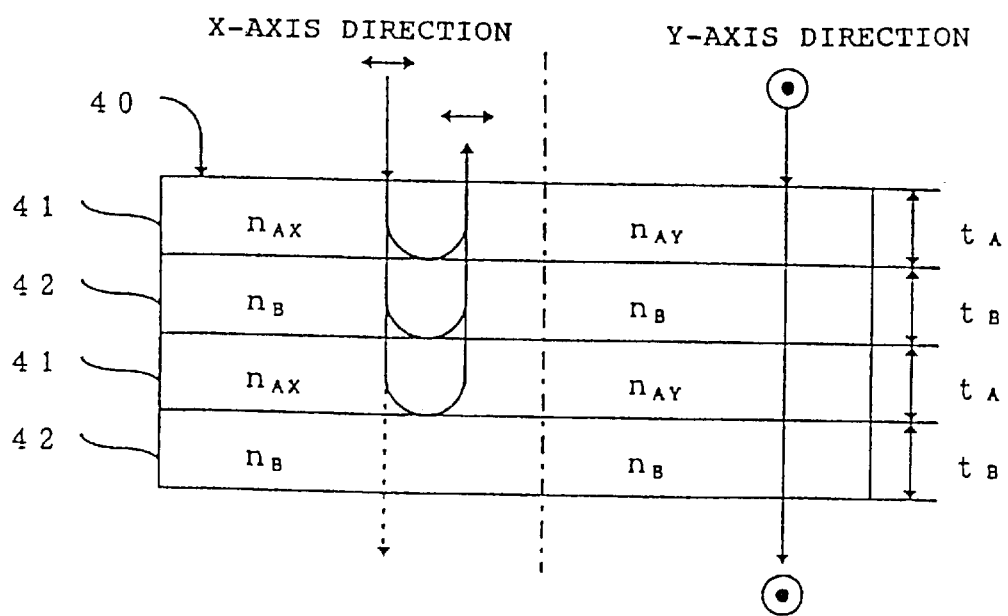
FIG. 3 is a conceptual diagram illustrative of the operation of the polarized light separator (reflective polarizer) of FIG. 2.

Referring to FIG. 2 and FIG. 3, a polarized light separator used for a liquid crystal display device of each embodiment in accordance with the present invention will be described.

FIG. 2 is a schematic perspective view of a reflective polarizer, which is an example of the polarized light separator used for each embodiment, and FIG. 3 is a conceptual diagram illustrative of the operation of the reflective polarizer shown in FIG. 2. The basic configuration of such a reflective polarizer has been disclosed in Published Japanese Translation of Japanese Unexamined Patent Publication No. 9-506985 (Published International Application: WO/95/17692) and Published International Application No. WO/95/27819.

In FIG. 2 and FIG. 3, a reflective polarizer 40 is formed of a thin-film multilayer film having a structure in which a plurality of layers of two different layers, namely, A layers 41 and B layers 42, are alternately stacked. In the reflective polarizer 40, a refractive index ($n_{AX}$) in the direction of an X-axis of the A layer 41 is different from a refractive index ($n_{AY}$) in the direction of a Y-axis. A refractive index ($n_{BX}$) in the direction of an X-axis of the B layer 42 is equal to a refractive index ($n_{BY}$) in the direction of a Y-axis. The refractive index ($n_{AX}$) in the direction of the X-axis of the A layer 41 and the refractive index ($n_{BX}$) in the direction of the X-axis of the B layer are different, whereas the refractive index ($n_{AY}$) in the direction of a Y-axis of the A layer 41 and the refractive index ($n_{BY}$) in the direction of the Y-axis of the B layer 42 are the same.

Accordingly, since the refractive indexes of the A layer 41 and the B layer 42 in the thin-film multilayer film are substantially equal, the linearly polarized light in the direction of the Y-axis among the light incident on the reflective polarizer 40 from a direction perpendicular to the top surface of the reflective polarizer 40 are transmitted through the reflective polarizer 40 and they outgo from the bottom surface as the light of the linearly polarized light in the direction of the Y-axis. Conversely, since the refractive indexes of the A layer 41 and the B layer 42 in the thin-film multilayer film are substantially equal, the linearly polarized light in the direction of the Y-axis among the light incident on the reflective polarizer 40 from a direction perpendicular to the bottom surface of the reflective polarizer 40 are transmitted through the reflective polarizer 40 and they outgo from the top surface as the light of the linearly polarized light in the direction of the Y-axis. In this case, the direction in which the light are transmitted (the direction of the Y-axis in this example) is referred to as a transmission axis.

If the thickness of the A layer 41 in the direction of a Z-axis is denoted as $t_A$, the thickness of the B layer 42 in the direction of the Z-axis is denoted as $t_B$, and the wavelength of an incident light is denoted as $\lambda$, then an equation shown below is given:

$$t_A \cdot n_{AX} + t_B \cdot n_{BX} = \lambda/2 \tag{1}$$

Therefore, of the light that have the wavelength $\lambda$ and have entered the reflective polarizer 40 from the direction perpendicular to the top surface of the reflective polarizer 40, the light of the linearly polarized light in the direction of the X-axis are reflected as the light of the linearly polarized light in the direction of the X-axis by the reflective polarizer 40 since the refractive index is different between the A layer 41 and the B layer 42 in the thin-film multilayer film. Likewise, of the light that have the wavelength $\lambda$ and have entered the reflective polarizer 40 from the direction perpendicular to the bottom surface of the reflective polarizer

40, the light of the linearly polarized light in the direction of the X-axis are reflected as the light of the linearly polarized light in the direction of the X-axis by the reflective polarizer 40 since the refractive index is different between the A layer 41 and the B layer 42 in the thin-film multilayer film. In this case, the direction in which the light are reflected (the direction of the X-axis in this example) is referred to as a reflective axis.

And by making an arrangement by changing the thickness $t_A$ in the direction of the Z-axis of the A layer 41 and the thickness $t_B$ in the direction of the Z-axis of the B layer 42 so that the foregoing equation (1) holds over the entire wavelength range of visible light, a reflective polarizer can be obtained which is an example of the polarized light separator that reflects the light of the linearly polarized light in the direction of the X-axis as the light of the linearly polarized light in the direction of the X-axis and that allows the light of the linearly polarized light in the direction of the Y-axis to be transmitted therethrough as the light of the linearly polarized light in the direction of the Y-axis not only for a single color but for all white light.

It is also possible to make an arrangement to provide display of a desired color rather than white by making an arrangement so that the equation (1) holds over a particular wavelength range of visible light thereby to reflect only the light in this particular wavelength range.

In the thin-film multilayer film constituting the reflective polarizer 40, a drawn polyethylene naphthalate (PEN) constituent may be used for the A layer 41, and a constituent of copolyester of naphthalene dicarboxylic acid and terephthalic or isothalic acid (coPEN) may be used for the B layer 42. Obviously, the constituents for the thin-film multilayer film employed in the embodiment are not limited to the above; the constituents may be selected as necessary.

The reflective polarizer 40 constructed as set forth above functions to reflect the light in the direction of the X-axis and transmit the light in the direction of the Y-axis over almost entire range of visible light; therefore, it functions as a reflector in a reflective display mode, while it functions to allow the light from a light source to be transmitted therethrough in a transmissive display mode. This makes the reflective polarizer ideally suited for the reflector for a semi-transmissive display device. At the same time, unlike the conventional polarizer that performs polarization and separation by absorption, the reflective polarizer performs polarization and separation by reflection with a consequent basically higher factor of light utilization, making itself ideally suited for a polarized light separating means that enables bright display in the reflective display mode.

Figure 1:
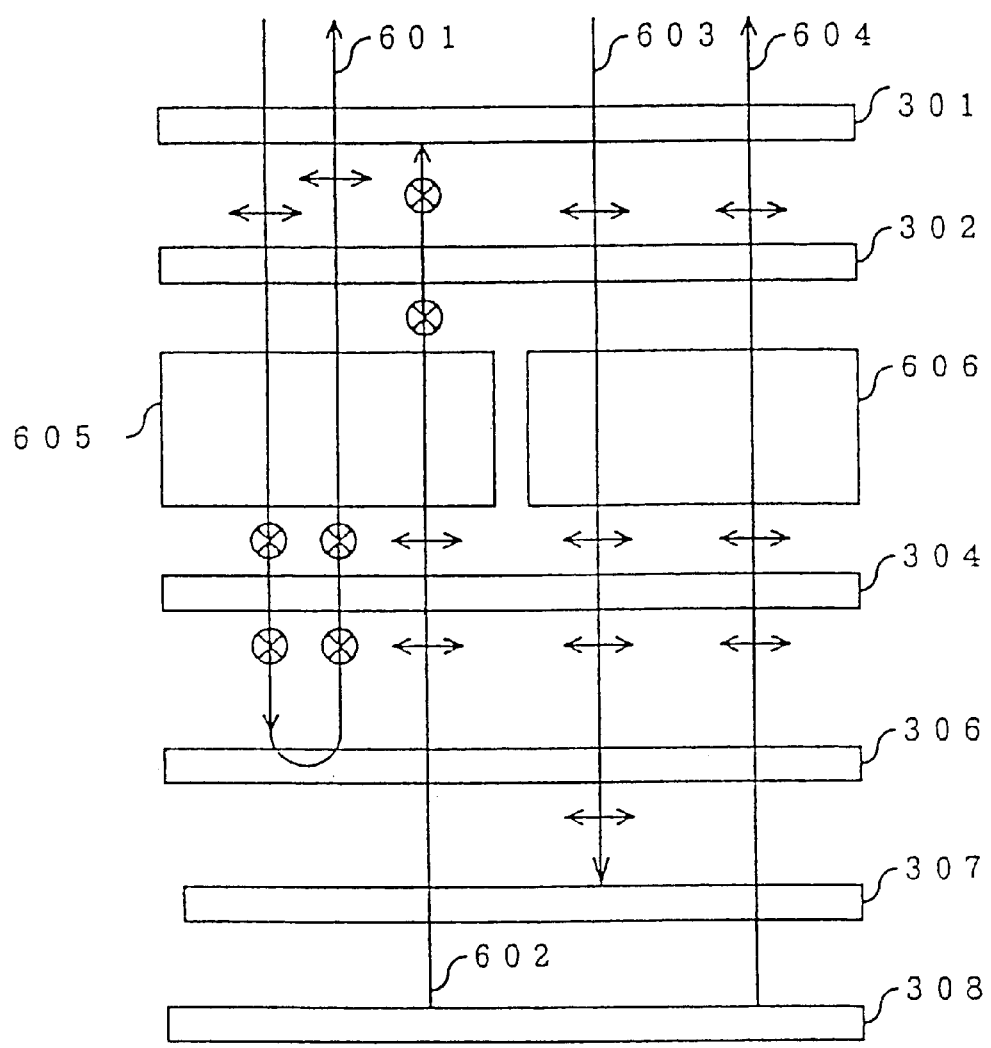
FIG. 1 is a schematic sectional view illustrative of the principle of operation in a reflective display mode and a transmissive display mode in a display device of a first embodiment in accordance with the present invention.

The operation in the reflective display mode and the transmissive display mode in the display device employing the reflective polarizer 40 described above is the same as the operation of the transflective type display device which has already been explained in conjunction with FIG. 1, which we have proposed in Japanese Patent Application No. 8-245346 (the application that was not yet laid open to the public on the priority date of the application concerned), and which employs a reflective polarizer.

More specifically, the transflective type display device employing the reflective polarizer 40 as shown in FIG. 1 enables brighter reflective display than that available with the conventional arts. In the transmissive display mode, however, the light reflected by the reflective polarizer 40 are used for display, while the light transmitted through the reflective polarizer 40 are used for display in the reflective display mode. Therefore, negative display is provided wherein a voltage applied region (a region where the polar-izing direction is not twisted in TN liquid crystal) of a TN liquid crystal layer is displayed in white in the transmissive display mode, whereas positive display is provided wherein a voltage applied region (a region where the polarizing direction is twisted 90 degrees in the TN liquid crystal) of the TN liquid crystal layer is displayed in white in the reflective display mode.

Hence, in such a display device, the positive-negative inversion mentioned previously takes place as long as the same voltage is applied to liquid crystal in both transmissive display mode and reflective display mode. In the display devices in the respective embodiments to be described below, different voltages are applied to liquid crystals by their driving devices in the transmissive display mode and the reflective display mode to drive the display devices so as to avoid the positive-negative inversion. More specifically, the transmission polarization axis in a liquid crystal layer, which is an example of a variable transmission polarization axis means, is changed by changing or inverting the liquid crystal applied voltage according to the ON/OFF state of the light source for performing the transmissive display so as to prevent the positive-negative inversion from occurring.

In the liquid crystal display device shown in FIG. 1, the TN liquid crystal has been taken as an example for the explanation. Alternatively, an STN liquid crystal, F-STN liquid crystal, ECB (Electrically Controlled Birefringence), or other type of liquid crystal, in which the transmission polarization axis can be changed by voltage or the like, may be used in place of the TN liquid crystal.

Various embodiments of the liquid crystal display device operated using the polarized light separator described above will be explained.

(First Embodiment)

A first embodiment of the present invention will be described with reference to FIG. 4 through FIG. 11.

Figure 4:
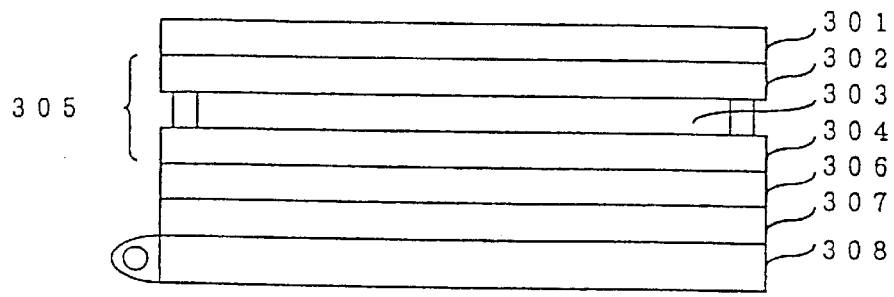
FIG. 4 is a sectional view showing the display device of the first embodiment in accordance with the present invention.
Figure 5:
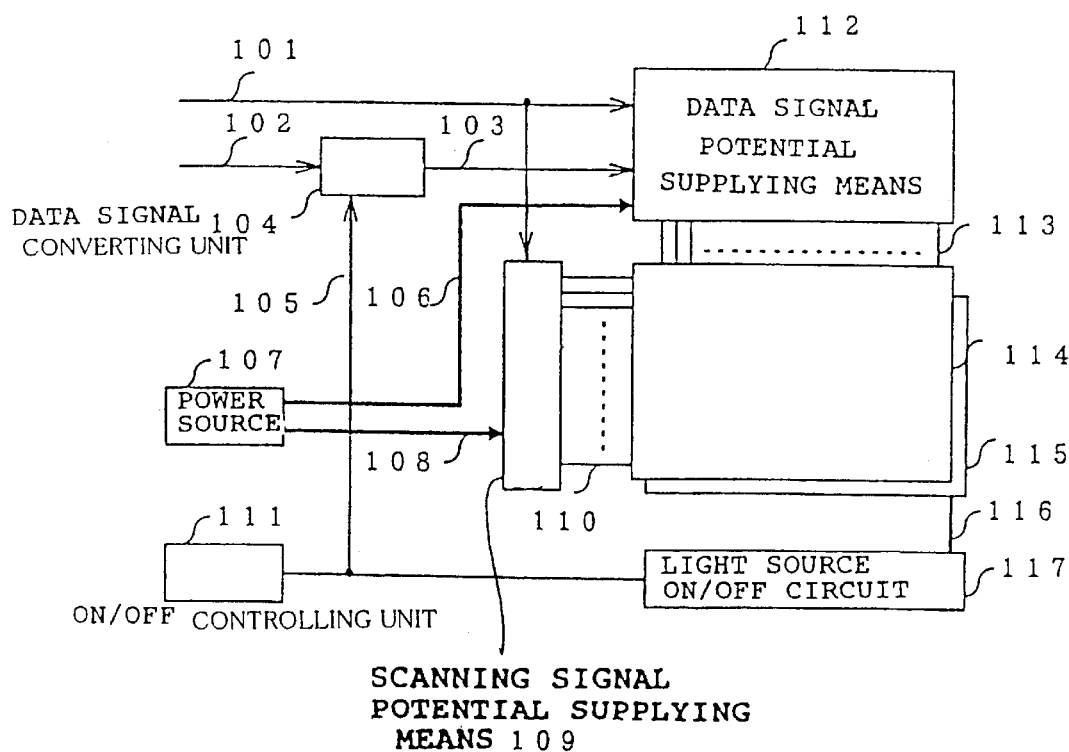
FIG. 5 is a block diagram showing the display device incorporating a driving device of the first embodiment in accordance with the present invention.
Figure 6:
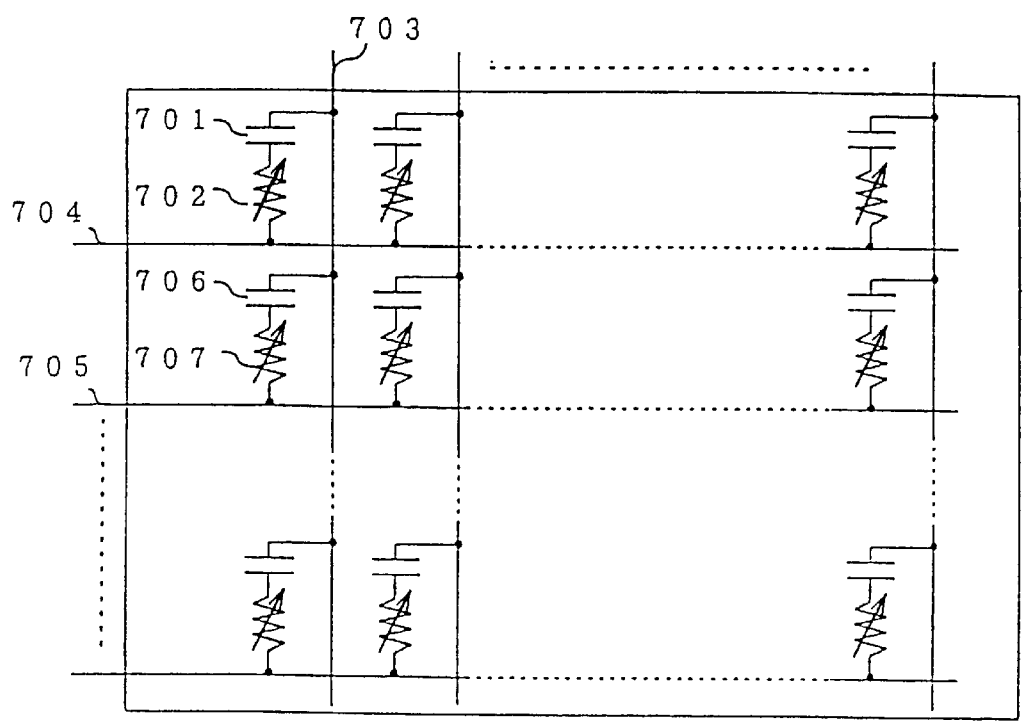
FIG. 6 is a circuit diagram showing an equivalent circuit of the display device of the first embodiment in accordance with the present invention.

FIG. 4 is a sectional view showing a display device in this embodiment, and FIG. 5 is a block diagram showing the display device including a driving device. FIG. 6 is an equivalent circuit diagram illustrative of reflective display and transmissive display of the display device in this embodiment.

First, the display device section excluding the driving device in this embodiment will be described in conjunction with FIG. 4.

In FIG. 4, the display device is equipped with, as an example of a variable transmission polarization axis element, a liquid crystal panel 305 having a TN liquid crystal layer 303 sandwiched between an upper glass substrate 302 and a lower glass substrate 304. A polarizer 301, which is an example of a first polarized light separating means, is disposed on the upper side of the liquid crystal panel 305. Provided on the lower side of the liquid crystal panel 305 is a reflective polarizer 306 which is disposed so that the transmission axis thereof and the transmission axis of the polarizer 301 are roughly aligned with each other and which is an example of a second polarized light separating means. Provided on the lower side of the reflective polarizer 306 are a semi-transmissive light absorption layer 307 and a light source 308 disposed in this order. A plurality of data signal lines (not shown), TFD elements (not shown) connected to data signals, and driving electrodes (not shown) connected to the respective TFD elements are formed on the TN liquid crystal layer 303 side of the upper glass substrate 302. A plurality of scanning signal lines (not shown) are formed on the TN liquid crystal layer 303 side of the lower glass substrate 304; the TN liquid crystal layer 303 at the intersection of the scanning signal line and the driving electrode is driven by a differential voltage based on the potential supplied to the scanning signal line and the potential supplied to the driving electrode.

As the semi-transmissive light absorption layer 307 in this embodiment, a black light absorber with an opening is used. As the light source 308, a backlight having a cold-cathode tube disposed beside a light guiding plate is used.

In this embodiment, the TFD elements are used; however, other two-terminal elements exhibiting diode characteristics may be used or three-terminal elements represented by TFT elements may of course be used. The embodiment can be applied to a passive matrix type device.

In this embodiment, the logical value of a data signal is inverted in synchronization with the switching between the transmissive display mode and the reflective display mode by turning ON/OFF the light source 308 so as to prevent the positive-negative inversion at the time of switching between the reflective display mode and the transmissive display mode.

Referring now to FIG. 5 through FIG. 11, the configuration for preventing the positive-negative inversion will be described in detail.

In FIG. 5, the display device is equipped with a data signal potential supplying means (X driver circuit) 112 and a scanning signal potential supplying means (Y driver circuit) 109, and it drives a data signal line 113 and a scanning signal line 110, respectively, of a liquid crystal panel 114 that corresponds to the liquid crystal panel 305 shown in FIG. 4. The display device is further equipped with an ON/OFF controlling means 111 and a light source ON/OFF circuit 117 to turn ON a light source 115 that corresponds to the light source 308 shown in FIG. 4 when performing the transmissive display. The display device is further provided with a data signal converting means 104 for inverting data signals depending on whether the display mode is the reflective display mode or the transmissive display mode, and a liquid crystal driving power source 107 for supplying driving voltages to the data signal potential supplying means 112 and the scanning signal potential supplying means 109.

A data signal potential 106 is supplied from the liquid crystal driving power source 107 to the data signal potential supplying means 112 and supplied to the liquid crystal panel 114 via the data signal line 113. On the other hand, a data signal 102 goes through the data signal converting means 104 to be input as a data signal 103 to the data signal potential supplying means 112. The data signal potential supplied to the liquid crystal panel 114 is decided by the data signal 103.

A scanning signal potential 108 is supplied from the liquid crystal driving power source 107 to the scanning signal potential supplying means 109 and further supplied to the liquid crystal panel 114 via the scanning signal line 110. A timing control signal 101 supplied to the data signal potential supplying means 112 and the scanning signal potential supplying means 109 controls the timing at which the data signal potential 106 and the scanning signal potential 108 are supplied to the liquid crystal panel 114.

An ON/OFF control signal 105 is supplied to a light source ON/OFF circuit 117 from the ON/OFF state controlling means 111 which includes, for example, a selector switch or the like for a user to select a desired mode from between the reflective display mode and the transmissive display mode. When the ON/OFF control signal 105 is at an H (high) level, the light source ON/OFF circuit 117 applies a light source driving voltage 116 to the light source 115 to turn the light source 115 ON so as to perform the transmissive display. Conversely, when the ON/OFF control signal 105 is at an L (low) level, the light source ON/OFF circuit 117 does not apply the light source driving voltage 116 to the light source 115 to turn the light source 115 OFF so as to perform the reflective display.

Incidentally, the ON/OFF control signal 105 is supplied to the foregoing data signal converting means 104 at the same time it is supplied to the light source ON/OFF circuit 117. The data signal converting means 104 inverts the data signal 102 when the ON/OFF control signal 105 is at the H level, whereas it does not invert the data signal 102 when the ON/OFF control signal 105 is at the L level. In other words, the data signal is switched in synchronization with the ON/OFF of the light source 115, so that the data signal potential 106 is also switched in synchronization with the ON/OFF of the light source 115 at the point when it is supplied to the data signal line 113.

Some or all of the peripheral circuits of the liquid crystal panel 114 including the data signal potential supplying means 112 and the scanning signal potential supplying means 109 or the like may be formed on the substrate constituting the liquid crystal panel, or they may be formed on a TAB substrate (not shown), on which a driver IC and other components for driving the liquid crystal are mounted, and may be connected to the liquid crystal panel.

Figure 7:
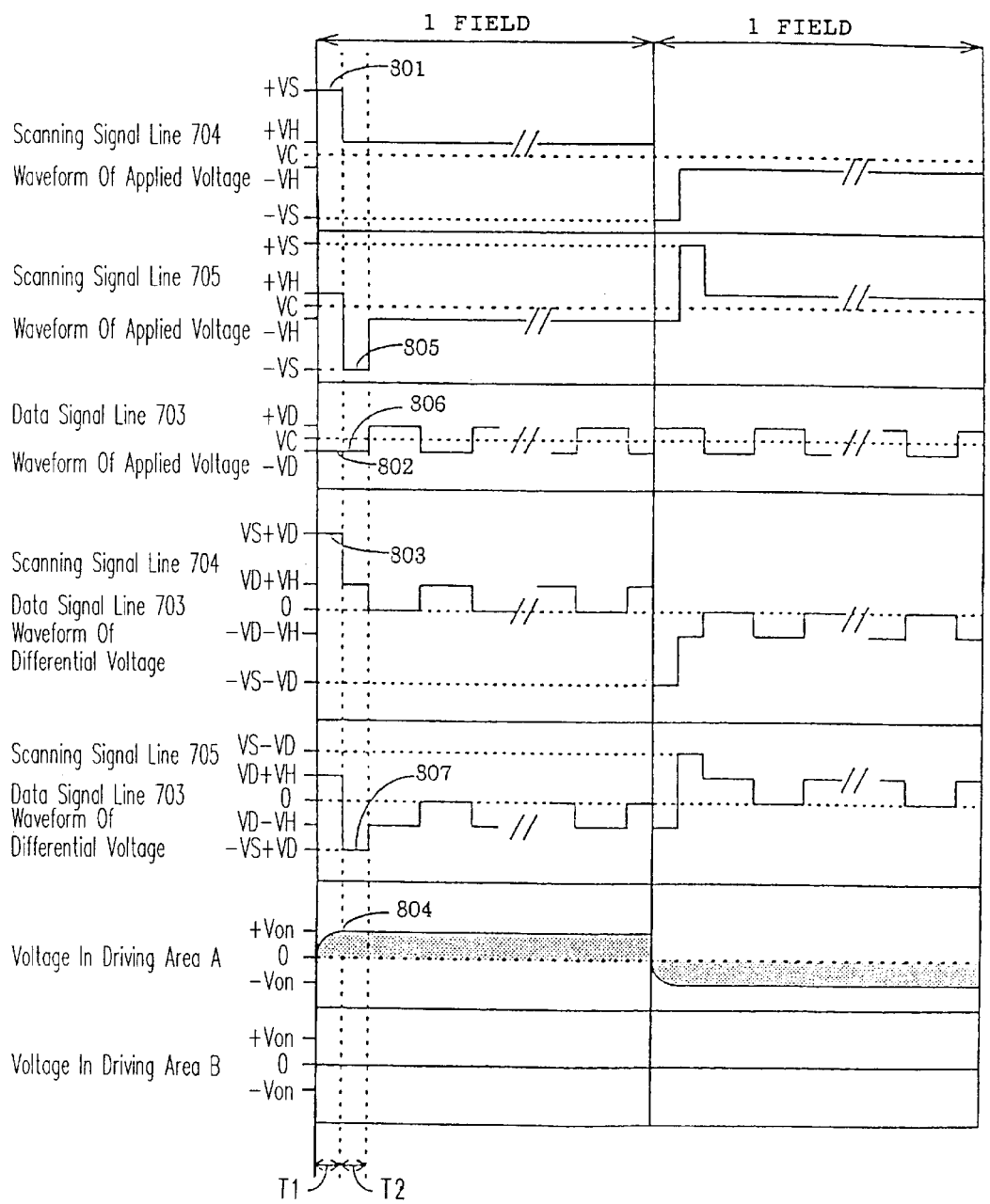
FIG. 7 shows waveform diagrams of the driving voltage waveforms in a reflective display mode of the display device of the first embodiment in accordance with the present invention.
Figure 8:
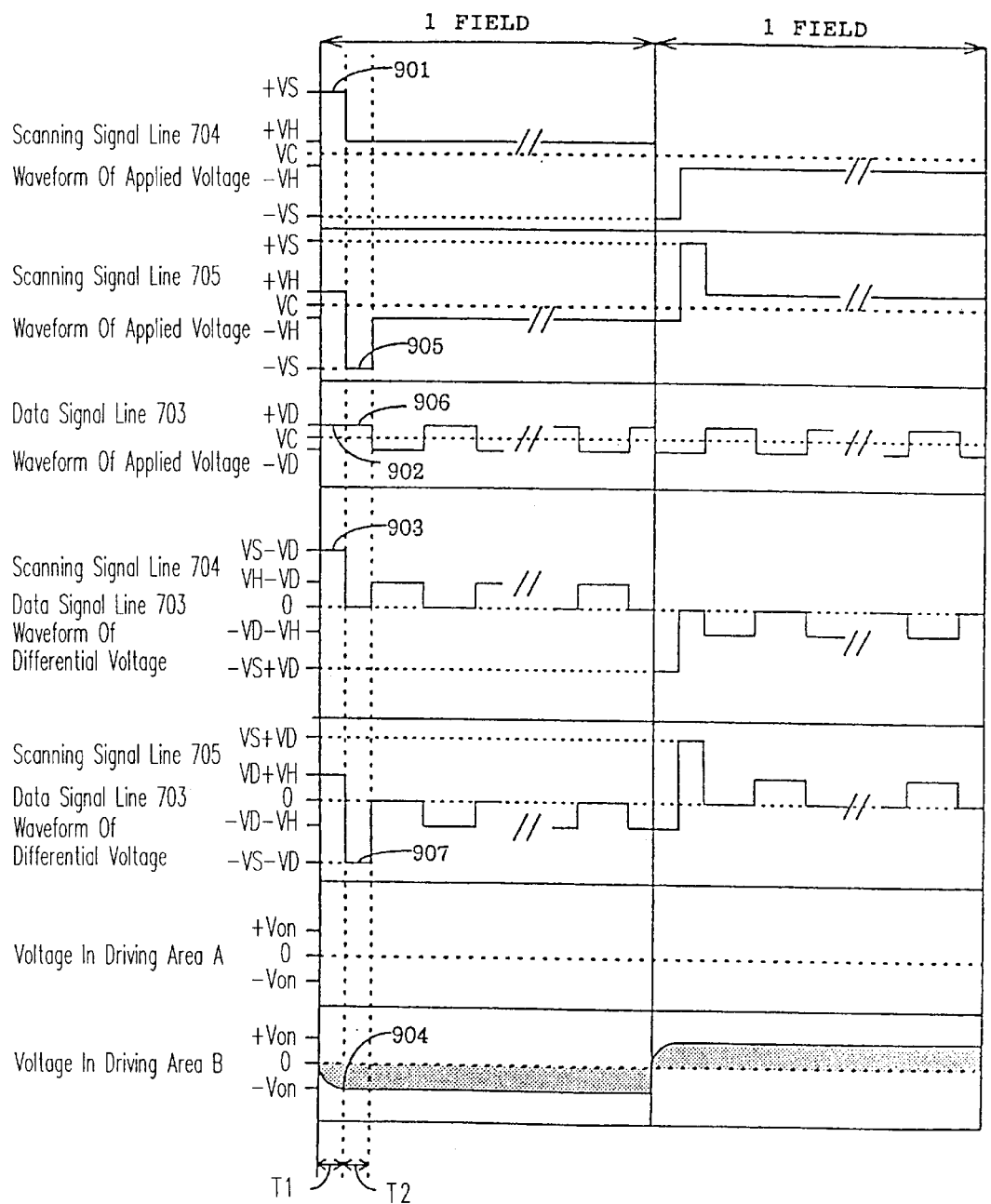
FIG. 8 shows waveform diagrams of the driving voltage waveforms in a transmissive display mode of the display device of the first embodiment in accordance with the present invention.

Referring now to FIG. 6 through FIG. 8, the principle of display of the display device in this embodiment will be discussed. FIG. 6 is a circuit diagram showing an equivalent circuit of a TFD element in the display part of the liquid crystal panel employed in this embodiment, and FIG. 7 shows the driving waveforms in the reflective display mode of the display device in this embodiment. FIG. 8 shows the driving waveforms in the transmissive display mode of the display device in this embodiment. The display device is driven by AC voltage in order to prevent the deterioration of the liquid crystal. Regarding the driving waveforms shown in FIG. 7 and FIG. 8, the polarity is reversed for each field, and the polarity is also reversed for each line (scanning signal line 110).

In this description, the principle of display will be discussed by referring to, as an example, a case wherein black display is provided in a driving region A corresponding to the intersection of a data signal line 703 and a scanning signal line 704, while white display is provided in a driving region B corresponding to the intersection of the data signal line 703 and the scanning signal line 705. In FIG. 6, reference numeral 701 denotes a capacitor of the driving region A, and reference numeral 706 denotes a capacitor of the driving region B.

First, the reflective display will be described in conjunction with FIG. 6 and FIG. 7. During a period T1, a selection potential +VS (801) exceeding a threshold voltage of the TFD element 702 is supplied to the scanning signal line 704, and at the same time, a potential −VD (802) for charging the capacitor 701 of the driving region A is supplied to the data signal line 703, thus producing a differential voltage of +VS+VD (803), causing the capacitor 701 of the driving region A to be charged to +Von (804). After that, the voltage of +Von is maintained at the capacitor 701 of the driving region A until the selection voltage is applied to the scanning signal line 704, and in the next field, the capacitor 701 is charged to a voltage of the opposite polarity, −Von. In this case, since the voltage is applied to the TN liquid crystal layer, the incident light from outside follows the route indicated by the optical path 603 of FIG. 1 and it is absorbed by the semi-transmissive light absorption layer 307, thus providing the black display.

During a period T2, a selection potential −VS (805) exceeding a threshold voltage of a TFD element 707 is supplied to the scanning signal line 705, and −VD (806) is supplied to the data signal line 703, thus producing a differential voltage of −VS+VD (807); therefore, the capacitor 706 of the driving region B is not charged and no voltage is applied to the TN liquid crystal layer. Hence, the incident light from outside traces the route indicated by the optical path 601 of FIG. 1 and it is emitted from the polarizer 301, thus providing the white display.

Referring now to FIG. 6 and FIG. 8, the transmissive display will be described. In the transmissive display mode, the potential of the data signal is inverted in synchronization with the turning ON of the light source; hence, in the period T1, a selection potential +VS (901) exceeding the threshold voltage of the TFD element 702 is supplied to the scanning signal line 704, and at the same time, a potential +VD (902) for charging the capacitor 701 of the driving region A is supplied to the data signal line 703. The differential voltage is +VS−VD (903), and the capacitor 701 of the driving region A is not charged and the no voltage is applied to the TN liquid crystal layer. Hence, the light from the light source travels along the route indicated by an optical path 602 of FIG. 1 until it is absorbed by the polarizer 301, thus providing the black display.

On the other hand, in the period of T2, a selection potential −VS (905) exceeding the threshold voltage of the TFD element 707 is supplied to the scanning signal line 705, while +VD (906) is supplied to the data signal line 703, producing a differential voltage of −VS−VD (907); therefore, the capacitor 706 of the driving region B is charged to −Von (904) and then charged to a voltage of the opposite polarity, +Von, in the following field. In this case, since the voltage is applied to the TN liquid crystal layer, the light from the light source traces the route indicated by the optical path 604 of FIG. 1 until it is emitted from the polarizer 301, thus providing the white display.

As set forth above, the display state does not change when switching between the reflective display mode and the transmissive display mode during the period T1 and the period T2, meaning that the display does not incur the positive-negative inversion.

Specific configurations and operations the ON/OFF state controlling means and the data signal converting means will now be described with reference to FIG. 9 through FIG. 11.

FIG. 9 is a diagram showing an example of the ON/OFF state controlling means 111 shown in FIG. 5.

In FIG. 9, the ON/OFF state controlling means is equipped with a switch 1001, a pull-up resistor 1002, a CR circuit 1003, a resistor 1004 constituting the CR circuit, a capacitor 1005 constituting the CR circuit, and a Schmidt inverter 1006. In this example, chattering is prevented by the CR circuit 1003 and the Schmidt inverter 1006. If it is referred to as "ON" when the terminals of the switch 1001 are connected, then the switch 1001 sets the logic of the ON/OFF control signal 105 to the H level when the switch is turned ON, while it sets the logic to the L level when it is turned OFF.

When the switch 1001 is turned OFF and the ON/OFF control signal 105 is set at the L level, the light source ON/OFF circuit 117 shown in FIG. 5 stops the light source driving voltage 116 to turn OFF the light source 115 so as to set the liquid crystal panel 114 for the reflective display mode. When the switch 1001 is turned ON and the ON/OFF control signal 105 is set at the H level, the light source ON/OFF circuit 117 outputs the light source driving voltage 116 to turn ON the light source 115 so as to set the liquid crystal panel 114 for the transmissive display mode.

FIG. 10 is a diagram showing an example of the data signal converting means 104 shown in FIG. 5.

In FIG. 10, the data signal converting means is composed of an inverting circuit 1101 that takes an exclusive OR of the ON/OFF control signal 105 and the data signal 102 to generate a data signal b103. In this example, the data signal is a digital signal; hence, an exclusive OR circuit is employed as the inverting circuit 1101. If the data signal is an analog signal, however, then the inverting circuit 1101 may be configured using an operational amplifier inverting circuit or the like. Thus, the data signal 102 used for the present invention may be a digital signal of a pulse width modulation system or an analog signal of a voltage modulation system.

FIG. 11 shows a truth value table of the data signal converting means shown in FIG. 10. The reflective display mode is set when the ON/OFF control signal 105 is at the L level, namely, 0; when a data signal "a" (the data signal 102 at the input side of the inverting circuit 1101) is 0, a data signal "b" (the data signal 103 at the output side of the inverting circuit 1101) is 0, and when the data signal "a" is 1, the data signal "b" is 1. The transmissive display mode is set when the ON/OFF control signal 105 is at the H level, namely, 1; when the data signal "a" is 0, the data signal "b" is 1, and when the data signal "a" is 1, the data signal "b" is 0.

Thus, the data signal converting means 104 shown in FIG. 5 employs the inverting circuit 1101 shown in FIG. 10 to invert the logic of the data signal in the transmissive display mode with respect to the data signal in the reflective display mode.

In the above description, only the black display and the white display have been discussed; however, it is obvious that the display device used in this embodiment is able to provide halftone display and also to provide color display by attaching a color filter on either substrate.

(Second Embodiment)

Figure 12:
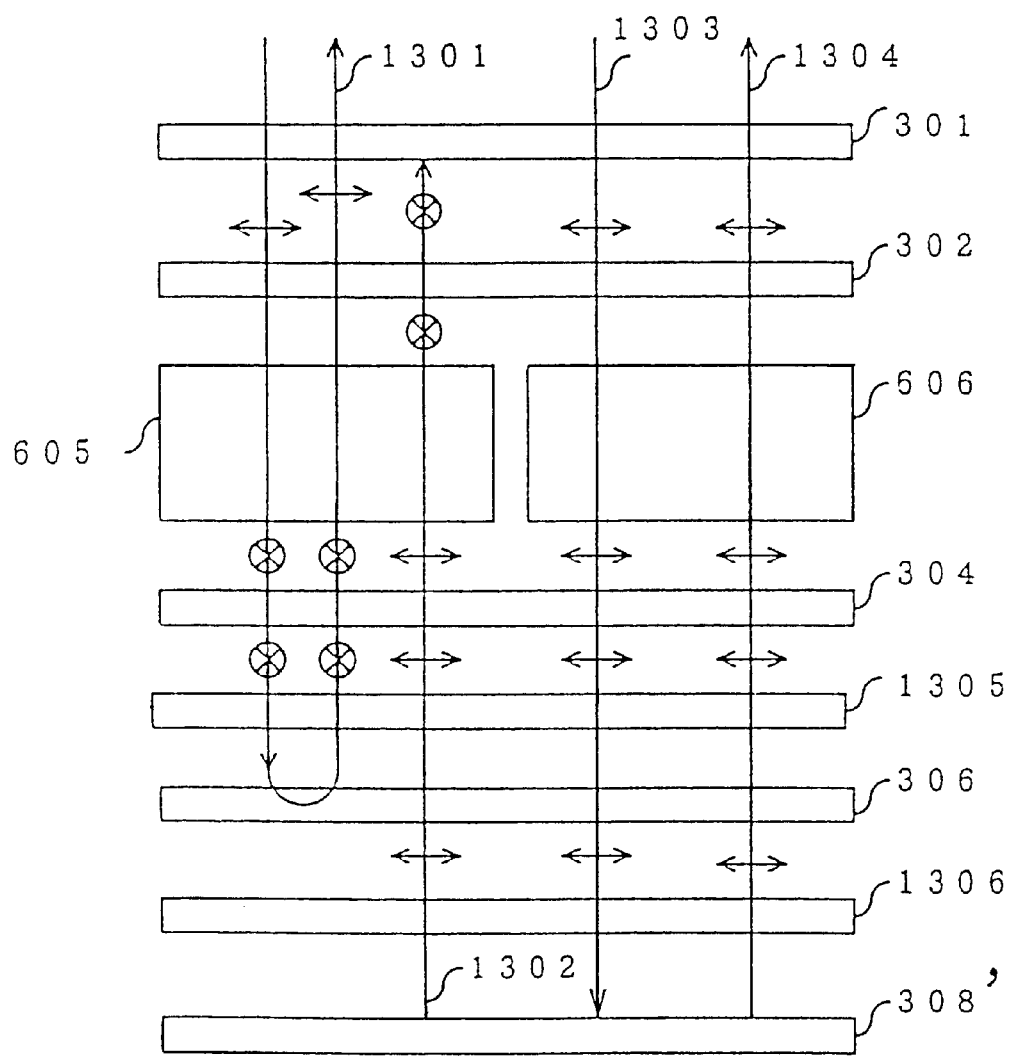
FIG. 12 is a schematic sectional view illustrative of the principle of operation in a reflective display mode and a transmissive display mode in a display device of a second embodiment in accordance with the present invention.

A second embodiment in accordance with the present invention will be described with reference to FIG. 12.

A display device used in the second embodiment has almost the same configuration as that of the display device described in conjunction with FIG. 1 except for the following aspect. First, in the first embodiment, the black light absorber provided with the opening has been used as the semi-transmissive light absorption layer 307, while in the second embodiment, a polarizing means 1306 with its transmission axis roughly aligned with a reflective polarizer 306 is used. Further, a light diffusing plate 1305 is provided between the reflective polarizer 306 and a lower glass substrate 304. Furthermore, the surface color of a light source 308' is dark.

First, the white display and the black display in a reflective display mode of the display device in accordance with the second embodiment will be described.

When a light indicated by an optical path 1301 enters the display device as external light, it is converted by the polarizer 301 into a linearly polarized light parallel to a paper surface, twisted by 90 degrees in its direction of polarization in a voltage non-applied region 605 of a TN liquid crystal layer to become a light of a linearly polarized light perpendicular to the paper surface, reflected by the reflective polarizer 306 as the linearly polarized light perpendicular to the paper surface, twisted again in its voltage non-applied region 605 of the TN liquid crystal layer by 90 degrees in the direction of polarization to become a linearly polarized light parallel to the paper surface, and outgoes from the polarizer 301. Hence, when no voltage is applied, the white display is provided.

On the other hand, when a light indicated on an optical path 1303 enters the display device as an external light, it is converted by the polarizer 301 into a linearly polarized light parallel to the paper surface and transmitted as the linearly polarized light parallel to the paper surface without changing its direction of polarization in a voltage applied region 606 of the TN liquid crystal layer, transmitted through the reflective polarizer 306 also without changing its direction of polarization, then further transmitted through the polarizing means 1306, which has its transmission axis roughly aligned with the reflective polarizer 306, also without changing its direction of polarization. The transmitted light is absorbed by the light source 308' having the dark surface color, thus providing the black display.

The black display and the white display in a transmissive display mode of the display device in accordance with the second embodiment will now be described. A light which is emitted from the light source 308' and which is indicated on an optical path 1302 is converted through the semi-transmissive light absorption layer 1306 into a linearly polarized light parallel to the paper surface, transmitted through the reflective polarizer 306 as the linearly polarized light parallel to the paper surface, twisted 90 degrees in its direction of polarization in the voltage non-applied region 605 of the TN liquid crystal layer to become a linearly polarized light perpendicular to the paper surface, and absorbed by the polarizer 301, thus providing the black display.

On the other hand, a light which is emitted from the light source 308' and which is indicated on an optical path 1304 is converted through the semi-transmissive light absorption layer 1306 into a roughly linearly polarized light parallel to the paper surface, transmitted through the reflective polarizer 306 as the linearly polarized light parallel to the paper surface, transmitted without changing its direction of polarization in the voltage applied region 606 of the TN liquid crystal layer, and transmitted through the polarizer plate 301 as a linearly polarized light parallel to the paper surface, thus providing the white display.

In this embodiment, with respect to the light from the light source 308', the reflective polarizer 306 transmits even the light, which are not aligned with the transmission axis, to a certain extent, resulting in lower contrast in the transmissive display mode. However, the presence of the polarizing means 1306 causes a linearly polarized light roughly aligned with the transmission axis thereof to enter it so as to make up for the polarizing function of the reflective polarizer 306, thus leading to improved contrast in the transmissive display mode.

Furthermore, since the light diffusing plate 1305 is provided, good white display can be obtained for the reflective display and the transmissive display. If, however, the light diffusing plate 1305 is not provided, a mirror surface display is obtained; hence, it is preferable to provide the light diffusing plate 1305 according to the application of the display device.

If a semi-transmissive light absorption layer 307 (refer to FIG. 1) provided in the first embodiment is further provided between the polarizing means 1306 and the light source 308 instead of using the dark surface color of the light source 308', the same function will be obtained; the transmitted light from the reflective polarizer 306 in the reflective display mode is absorbed, and the light from the light source 308 can be transmitted to the polarizing means 1306 side.

The display device configured as set forth above is driven by a driving device shown in FIG. 5 as in the same configuration of the first embodiment. Therefore, since the logic of a data signal is inverted at the time of switching between the reflective display mode and the transmissive display mode, the display is free of the positive-negative inversion.

(Third Embodiment)

Figure 13:
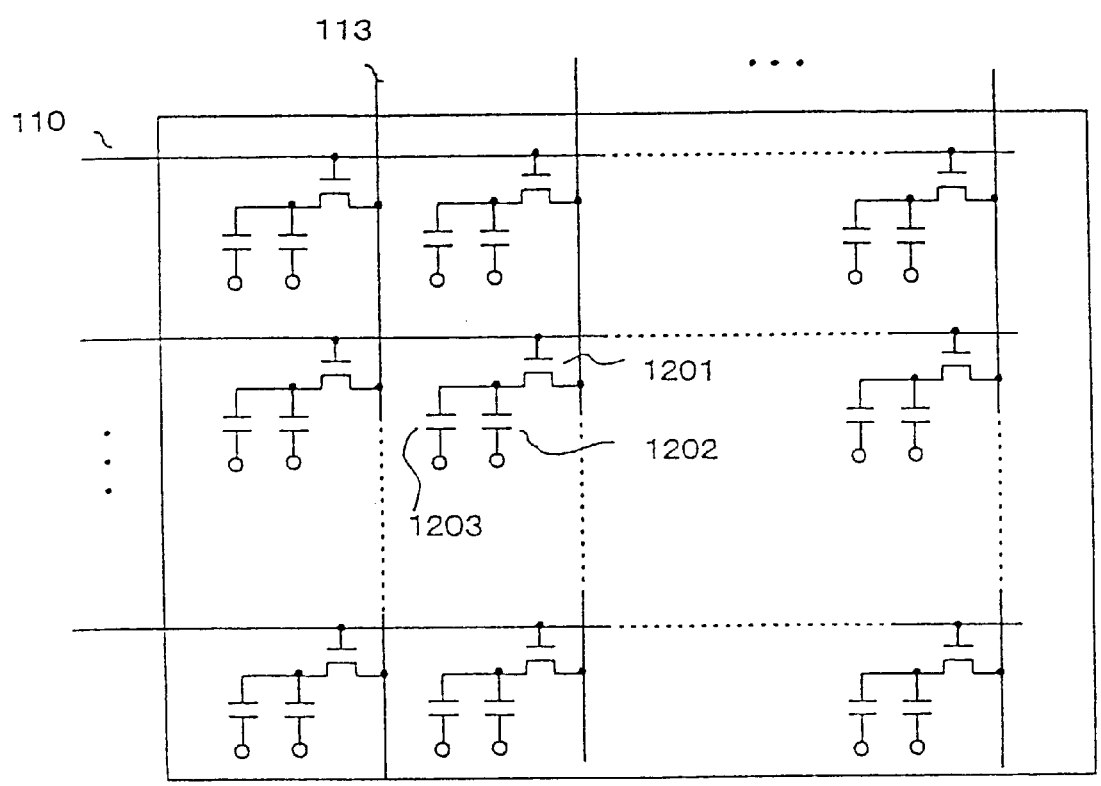
FIG. 13 is a circuit diagram showing an equivalent circuit of a display device of a third embodiment in accordance with the present invention.
Figure 14:
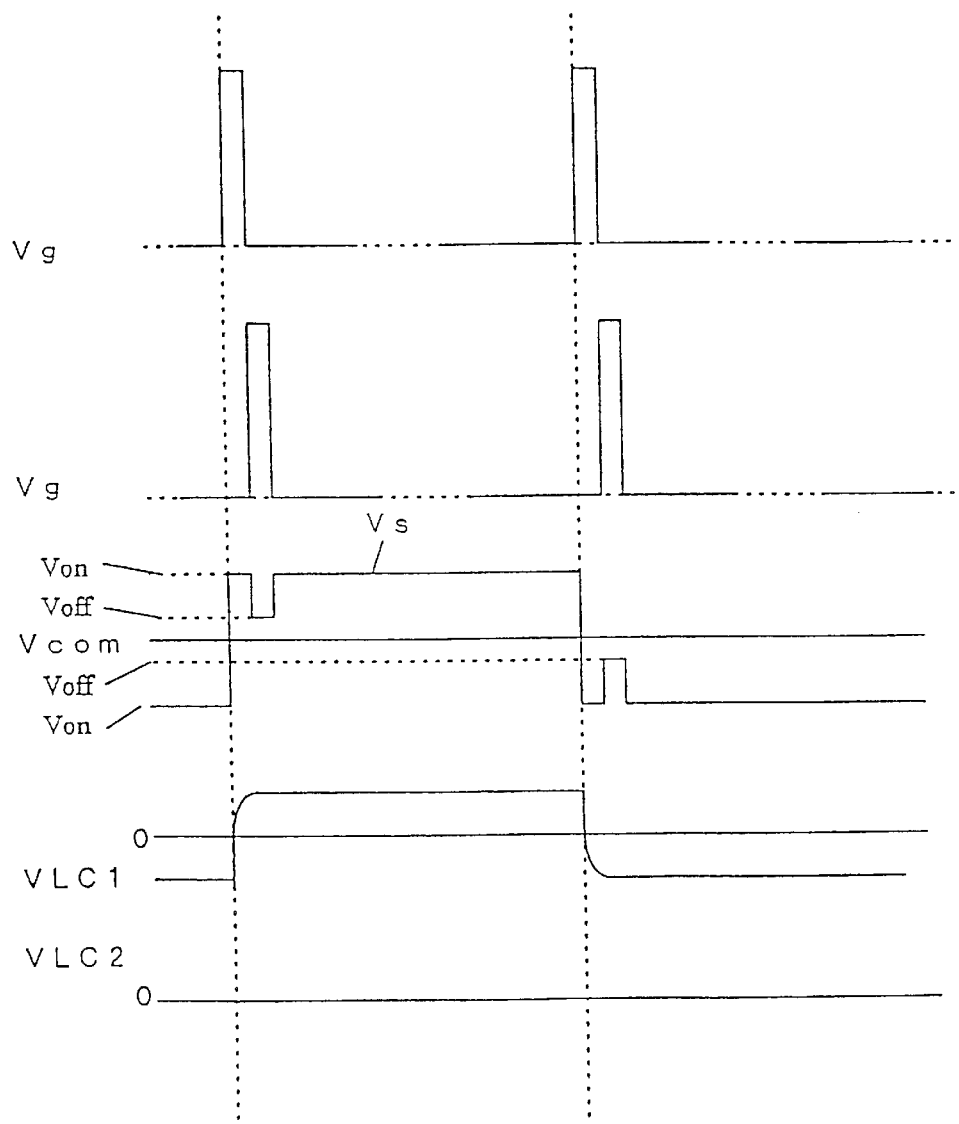
FIG. 14 is a waveform diagram showing the driving voltage waveforms in a reflective display mode of the display device of the third embodiment in accordance with the present invention.
Figure 15:
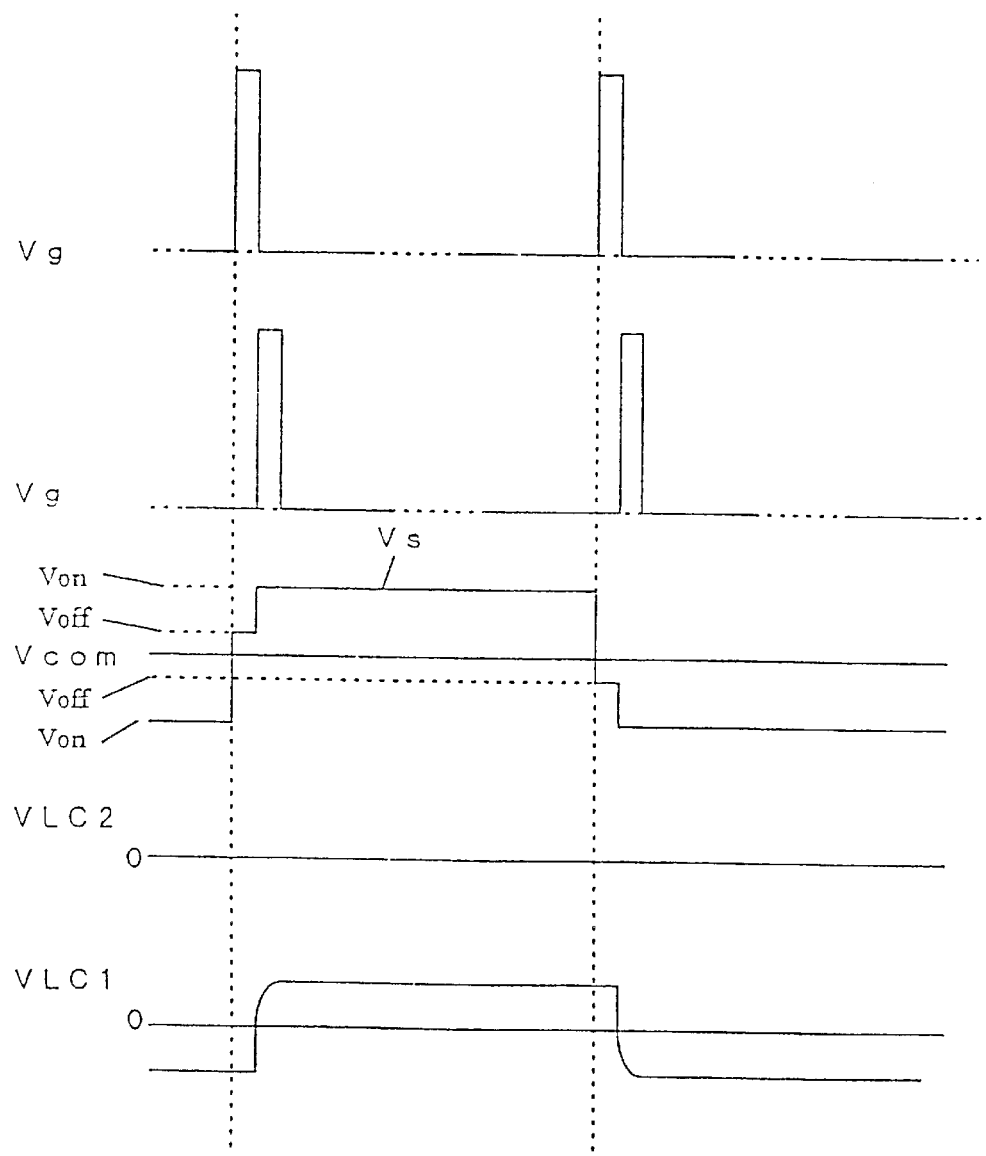
FIG. 15 is a waveform diagram showing the driving voltage waveforms in a transmissive display mode of the display device of the third embodiment in accordance with the present invention.

Referring to FIG. 13 through FIG. 15, a third embodiment in accordance with the present invention will be described. FIG. 13 is a circuit diagram showing an equivalent circuit of a TFT element in the display part of a liquid crystal panel used in this embodiment, and FIG. 14 shows the driving waveforms in a reflective display mode of a display device in this embodiment. FIG. 15 shows the driving waveforms in a transmissive display mode of the display device in this embodiment. The display device is driven on AC voltage to prevent deterioration in liquid crystal. The driving waveforms of FIG. 14 and FIG. 15 show the driving waveforms in so-called frame inversion drive where the polarity is inverted for each frame.

The TFD-driven liquid crystal panel has been used in the first and second embodiments, while a TFT-driven liquid crystal panel is employed in the third embodiment.

As shown in FIG. 13, in a TFT liquid crystal panel of a TFT active matrix driving system in this embodiment, a source electrode of each pixel TFT 1201 is connected to a data signal line 113, and a gate electrode of each pixel TFT 1201 is connected to a scanning signal line 110. And a drain electrode of each pixel TFT 1201 is connected to a liquid crystal capacitor 1202 via a pixel electrode and to a storage capacitor 1203 via a capacitance electrode.

In the same manner as shown in FIG. 5, supplied to the data signal line 113 and the scanning signal line 110 are data signals and scanning signals from a data signal potential supplying means (X driver) 112 and a scanning signal potential supplying means (Y driver) 109, respectively. Therefore, this embodiment is also configured to prevent the data signal from being inverted in the transmissive display mode or the data signal from being inverted in the reflective display mode by a data signal converting means 104 in accordance with the level of an ON/OFF control signal 105 from the ON/OFF state controlling means 111 as shown in FIG. 5. In the case of this embodiment, however, the data signal potential supplying means (X driver) 112 and the scanning signal potential supplying means (Y driver) 109 are configured such that they supply the data signals and the scanning signals as set forth below to run the pixel TFT 1201 by the active-matrix drive.

First, referring to FIG. 13 and FIG. 14, a description will be given to a signal supply operation for turning a pixel P1 ON and turning a pixel P2 OFF, which is adjacent to a Y direction along the pixel P1 and the data signal line 113, in the reflective display mode. In both FIG. 14 and FIG. 15, Vg in the topmost waveform diagrams denotes a gate electrode potential based on the scanning signal supplied to the pixel P1, Vg in the second top waveform denotes a gate electrode potential based on the scanning signal supplied to the pixel P2 and Vs denotes a source electrode potential based on the data signal supplied to the pixel P1 and the pixel P2, VLC1 denotes a liquid crystal applied voltage to the pixel P1, and VLC2 denotes a liquid crystal applied voltage to the pixel P2.

In FIG. 13 and FIG. 14, first, when the scanning signal is supplied via the scanning signal line 110 to the pixel TFT 1201 in the pixel P1 from a scanning signal potential supplying means (refer to FIG. 5), the gate electrode potential Vg is set at a high level in the form of a pulse over one horizontal scanning period. When the data signal for "black" is supplied to a pixel row including the pixels P1 and P2 via the data signal converting means, the data signal potential supplying means (refer to FIG. 5), and the data signal line 113 in synchronization with the foregoing scanning signal, the source electrode potential Vs of the respective pixel TFTs 1201 of that row is set to the level of Von because the data signal has not been inverted by the data signal converting means. Accordingly, the pixel TFT 1201 in the pixel P1 is placed in an ON state (conducting state) by the gate electrode potential Vg that has been set to the high level, and a source electrode potential Vs at the level of Von is supplied to a pixel electrode of the pixel P1 from the source electrode via the drain electrode. As a result, the liquid crystal applied voltage VLC1 is set at the high level. After that, the pixel TFT 1201 is put in an OFF state (non-conducting state) when the gate electrode potential Vg is set at the low level; therefore, even when the source electrode potential Vs is set at a level of Voff, the potential of the liquid crystal applied voltage VLC1 scarcely drops down from the high level and it is maintained at the level for one vertical period by the storage capacitor 1203 in particular. In other words, since the data signal converting means (refer to FIG. 5) does not perform inversion in response to the data signal corresponding to "black," the liquid crystal layer in the pixel P1 is placed in a voltage-applied state, thus providing the black display in the reflective display mode.

On the other hand, even when the source electrode potential Vs in the diagram is set to the level of Von, the gate electrode potential Vg is at the low level and the pixel TFT 1201 in the pixel P2 is in the OFF state (non-conducting state), so that the liquid crystal applied voltage VLC2 of the pixel P2 stays at the low level. In this state, when a scanning signal is supplied via the scanning signal line 110 from the scanning signal potential supplying means (refer to FIG. 5) to the pixel TFT 1201 in the pixel P2, the gate electrode potential Vg is switched to the high level in the form of a pulse over one horizontal scanning period. When a data signal corresponding to "white" is supplied to the row including the pixels P1 and P2 via the data signal converting means, the data signal potential supplying means (refer to FIG. 5), and the data signal line 113 in synchronization with the scanning signal, the source electrode potential Vs of the respective pixel TFTs 1201 in the row is set to the level of Voff because the data signal has not been inverted by the data signal converting means. Hence, the pixel TFT 1201 in the pixel P2 is set to the ON state (conducting state) by the gate electrode potential Vg that has been switched to the high level, and the source electrode potential Vs at the level of Voff is supplied to the pixel electrode of the pixel P1 via the drain electrode from the source electrode. As a result, the liquid crystal applied voltage VLC2 is set at the low level. After that, the pixel TFT 1201 is put in the OFF state (non-conducting state) when the gate electrode potential Vg is set at the low level; therefore, even when the source electrode potential Vs is set at a level of Von, the potential of the liquid crystal applied voltage VLC2 scarcely rises from the low level and it is maintained at the level for one vertical period by the storage capacitor 1203 in particular. In other words, since the data signal converting means (refer to FIG. 5) does not perform inversion in response to the data signal corresponding to "white," the liquid crystal layer in the pixel P2 is placed in a voltage non-applied state, thus providing the white display in the reflective display mode.

Referring now to FIG. 13 and FIG. 15, a description will be given to the signal supplying operation for turning the pixel P1 OFF and the pixel P2 ON, which is the opposite case from the one illustrated in FIG. 14, in the transmissive display mode according to the same data signal as the data signal for the reflective display mode illustrated in FIG. 14.

In FIG. 13 and FIG. 15, first, when the scanning signal is supplied via the scanning signal line 110 to the pixel TFT 1201 in the pixel P1 from a scanning signal potential supplying means (refer to FIG. 5), the gate electrode potential Vg is set at the high level in the form of a pulse over one horizontal scanning period. When the data signal for "black" is supplied to the pixel row including the pixels P1 and P2 via the data signal converting means, the data signal potential supplying means (refer to FIG. 5), and the data signal line 113 in synchronization with the foregoing scanning signal, the source electrode potential Vs of the respective pixel TFTs 1201 of that row is set to the level of Voff because the data signal has been inverted by the data signal converting means. Accordingly, the pixel TFT 1201 in the pixel P1 is placed in an ON state (conducting state) by the gate electrode potential Vg that has been set to the high level, and a source electrode potential Vs at the level of Voff is supplied to the pixel electrode of the pixel P1 from the source electrode via the drain electrode. As a result, the liquid crystal applied voltage VLC1 is set to the low level. After that, the pixel TFT 1201 is put in the OFF state (non-conducting state) when the gate electrode potential Vg is set at the low level; therefore, even when the source electrode potential Vs is set at the level of Von, the potential of the liquid crystal applied voltage VLC1 scarcely rises from the low level and it is maintained at the level for one vertical period by the storage capacitor 1203 in particular. In other words, since the data signal converting means (refer to FIG. 5) performs inversion in response to the data signal corresponding to "black," the liquid crystal layer in the pixel P1 is placed in a voltage non-applied state, thus providing the black display in the transmissive display mode.

On the other hand, when a scanning signal is supplied via the scanning signal line 110 from the scanning signal potential supplying means (refer to FIG. 5) to the pixel TFT 1201 in the pixel P2, the gate electrode potential Vg is switched to the high level in the form of a pulse over one horizontal scanning period. When a data signal corresponding to "white" is supplied to the row including the pixels P1 and P2 via the data signal converting means, the data signal potential supplying means (refer to FIG. 5), and the data signal line 113 in synchronization with the scanning signal, the source electrode potential Vs of the respective pixel TFTs 1201 in the row is set to the level of Vonn because the data signal has been inverted by the data signal converting means. Hence, the pixel TFT 1201 in the pixel P2 is set to the ON state (conducting state) by the gate electrode potential Vg that has been switched to the high level, and the source electrode potential Vs at the level of Von is supplied to the pixel electrode of the pixel P1 via the drain electrode from the source electrode. As a result, the liquid crystal applied voltage VLC2 is set at the high level. After that, the pixel TFT 1201 is put in the OFF state (non-conducting state) when the gate electrode potential Vg is set at the low level; therefore, even when the source electrode potential Vs is set at the level of Voff, the potential of the liquid crystal applied voltage VLC2 scarcely drops down from the high level and it is maintained at the level for one vertical period by the storage capacitor 1203 in particular. In other words, since the data signal converting means (refer to FIG. 5) performs inversion in response to the data signal corresponding to "white," the liquid crystal layer in the pixel P2 is placed in a voltage applied state, thus providing the white display in the transmissive display mode.

Thus, according to the TFT active matrix drive in this embodiment, the data signal can be inverted by the data signal converting means shown in FIG. 5 depending on the ON/OFF state; hence, the liquid crystal applied voltage in each pixel is inverted via the data signal potential supplying means, the data signal line, and the pixel TFT according to the ON/OFF state. As a result, this embodiment is able to provide the display free of the positive-negative inversion upon the switching between the reflective display mode and the transmissive display mode.

(Fourth Embodiment)

Figure 16:
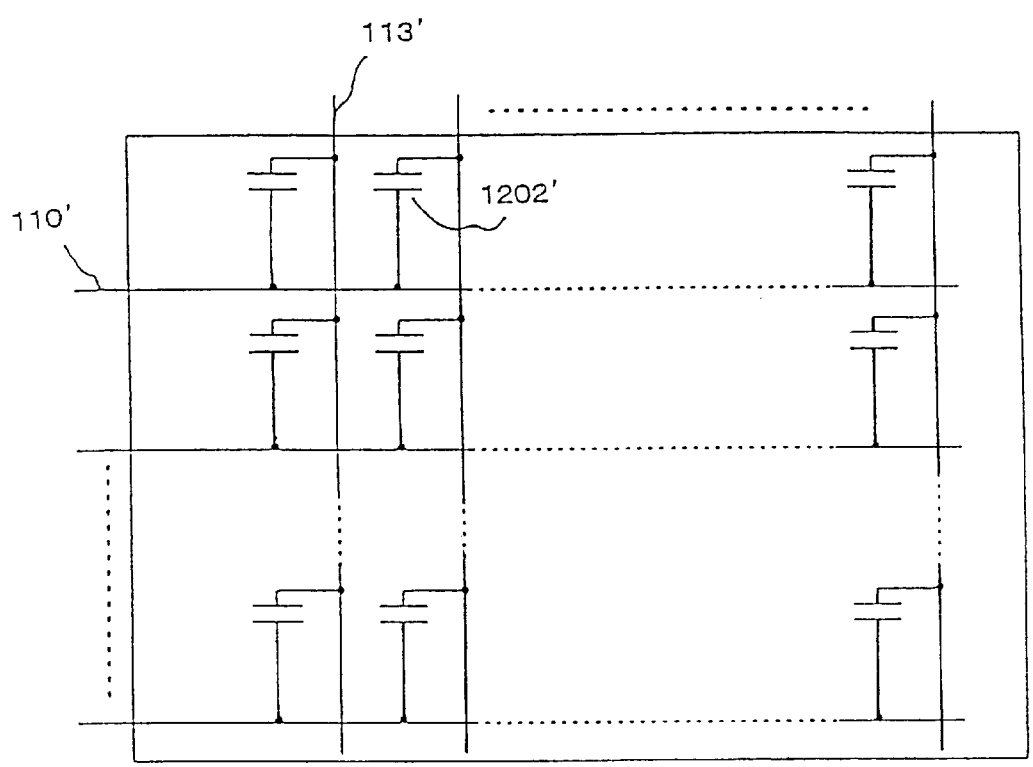
FIG. 16 is a circuit diagram showing an equivalent circuit of a display device of a fourth embodiment in accordance with the present invention.
Figure 17:
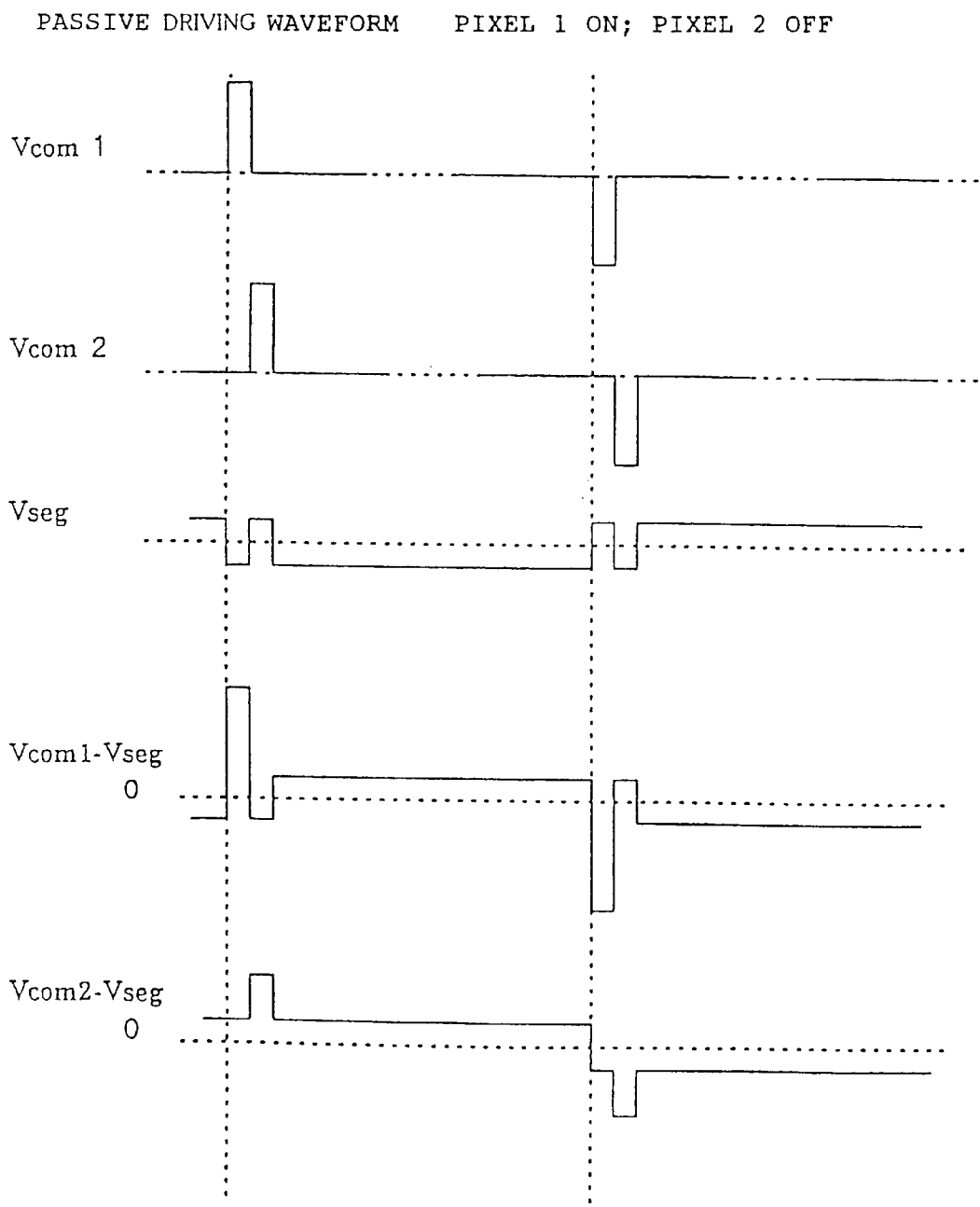
FIG. 17 is a waveform diagram showing the driving voltage waveforms in a reflective display mode of the display device of the fourth embodiment in accordance with the present invention.
Figure 18:
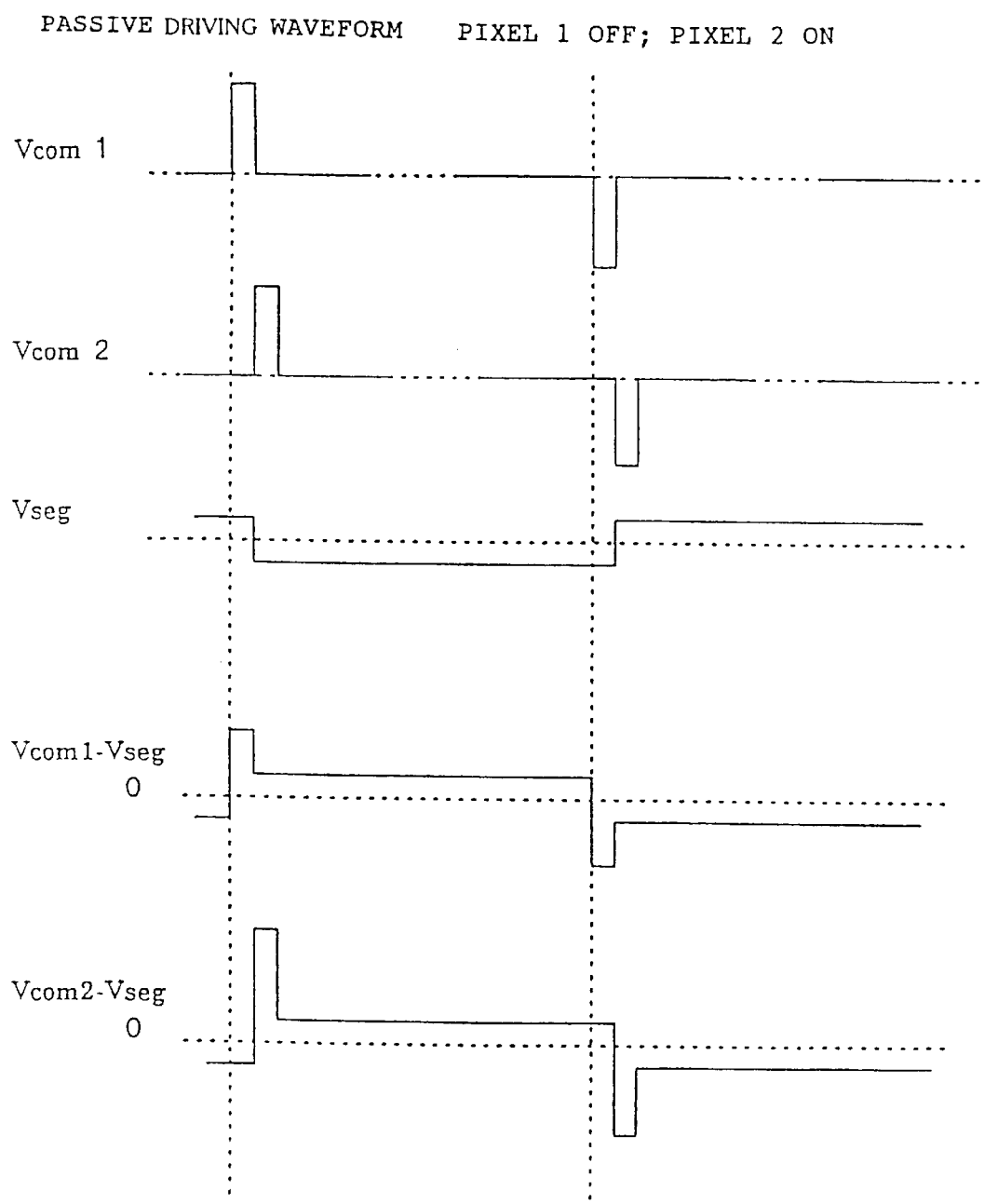
FIG. 18 is a waveform diagram showing the driving voltage waveforms in a transmissive display mode of the display device of the fourth embodiment in accordance with the present invention.
Figure 19:
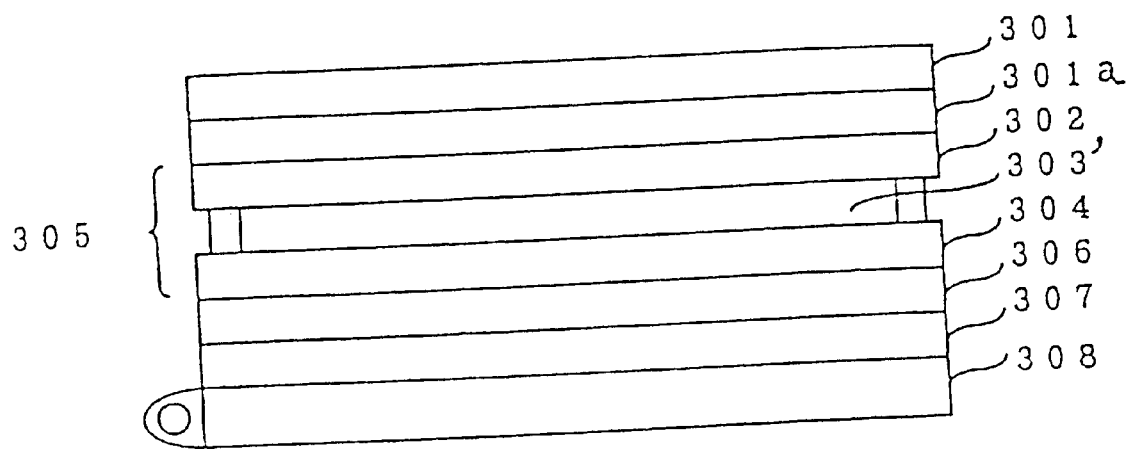
FIG. 19 is a sectional view of the display device of the fourth embodiment in accordance with the present invention.

Referring to FIG. 16 through FIG. 19, a fourth embodiment in accordance with the present invention will be described. FIG. 16 is a circuit diagram showing an equivalent circuit of the display part of a liquid crystal panel used in this embodiment, FIG. 17 shows the driving waveforms in a reflective display mode of a display device in this embodiment, and FIG. 18 shows the driving waveforms in a transmissive display mode of the display device in this embodiment. FIG. 19 is a sectional view of the display device in this embodiment. The display device is driven on AC voltage to prevent deterioration of liquid crystal. The driving waveforms of FIG. 17 and FIG. 18 show the driving waveforms in so-called frame inversion drive where the polarity is inverted for each frame.

The TFD-driven and the TFT-driven liquid crystal panels have been used in the respective embodiments set forth above, whereas a liquid crystal panel driven by a simple (passive) matrix is employed in the fourth embodiment.

As shown in FIG. 16, in a liquid crystal panel driven by the simple matrix in the present embodiment, a plurality of data signal lines 113' are disposed as transparent signal electrodes on one substrate (e.g. an upper glass plate) constituting the liquid crystal panel, while a plurality of scanning signal lines 110' are disposed as transparent scanning electrodes on the other substrate (e.g. a lower glass plate) constituting the liquid crystal panel. The liquid crystal panel is configured such that a liquid crystal applied voltage is applied to a liquid crystal layer section serving as a liquid crystal capacitor 1202 held between these data signal lines 113' and the scanning signal lines 110' at each intersection of the data signal lines 113' and the scanning signal lines 110'.

In the same manner as shown in FIG. 5, supplied to the data signal lines 113' and the scanning signal lines 110' are data signals and scanning signals from a data signal potential supplying means (X driver) 112 and a scanning signal potential supplying means (Y driver) 109, respectively. Therefore, this embodiment is also configured such that the data signal is inverted in the transmissive display mode and the data signal is not inverted in the reflective display mode by a data signal converting means 104 in accordance with the level of an ON/OFF control signal 105 from the ON/OFF state controlling means 111 as shown in FIG. 5. In the case of this embodiment, however, the data signal potential supplying means (X driver) 112 and the scanning signal potential supplying means (Y driver) 109 are configured such that they supply the data signals and the scanning signals as set forth below to drive the data signal lines 113' and the scanning signal lines 110' by the simple matrix.

First, referring to FIG. 16 and FIG. 17, a description will be given to a signal supply operation for turning a pixel P1 ON and turning a pixel P2 OFF which is adjacent to a Y direction along the pixel P1 and the data signal line 113' in the reflective display mode. In both FIG. 17 and FIG. 18, Vcom1 in the topmost waveform diagrams denotes a scanning electrode potential based on the scanning signal supplied to the pixel P1, Vcom2 in the second top waveform denotes a scanning electrode potential based on the scanning signal supplied to the pixel P2, Vseg denotes a signal electrode potential based on the data signal supplied to the pixel P1 and the pixel P2, (Vcom1-Vseg) denotes a liquid crystal applied voltage to the pixel P1, and (Vcom2-Vseg) denotes a liquid crystal applied voltage to the pixel P2.

In FIG. 16 and FIG. 17, first, when the scanning signal is supplied via the scanning signal line 110' to the pixel P1 from a scanning signal potential supplying means (refer to FIG. 5), the scanning electrode potential Vcom1 is set at a high level in the form of a pulse over one horizontal scanning period. When the data signal for "black" is supplied to a pixel row including the pixels P1 and P2 via the data signal converting means, the data signal potential supplying means (refer to FIG. 5), and the data signal line 113' in synchronization with the foregoing scanning signal, the signal electrode potential Vseg of the respective pixels of that row is set to the level of Von on a negative side in the chart because the data signal has not been inverted by the data signal converting means. Accordingly, the liquid crystal applied voltage (Vcom1-Vseg) exceeding a threshold value is supplied to the liquid crystal capacitor 1202 in the pixel P1. In other words, since the data signal converting means (refer to FIG. 5) does not perform inversion on the data signal corresponding to "black," the liquid crystal layer in the pixel P1 is placed in a voltage-applied state, thus providing the black display in the reflective display mode.

On the other hand, even when the scanning electrode potential Vcom1 in the diagram is set to a high level and the signal electrode potential Vseg is set to the level of Von, the liquid crystal applied voltage (Vcom1-Vseg) of the pixel P2 stays under the threshold value because the scanning electrode potential Vcom2 is at a low level at that point. In this state, when a scanning signal is supplied via the scanning signal line 110' from the scanning signal potential supplying means (refer to FIG. 5) to the pixel P2, the scanning electrode potential Vcom2 is switched to the high level in the form of a pulse for one horizontal scanning period. When a data signal corresponding to "white" is supplied to a row including the pixels P1 and P2 via the data signal converting means, the data signal potential supplying means (refer to FIG. 5), and the data signal line 113' in synchronization with the scanning signal, the signal electrode potential Vseg of the respective pixels in the row is set to the level of Voff on the positive side in the diagram because the data signal has not been inverted by the data signal converting means. Hence, the liquid crystal applied voltage (Vcom2-Vseg) exceeding the threshold value is not supplied to the liquid crystal capacitor 1202 in the pixel P2. In other words, since the data signal converting means (refer to FIG. 5) does not perform inversion in response to the data signal corresponding to "white," the liquid crystal layer in the pixel P2 is placed in a voltage non-applied state, thus providing the white display in the reflective display mode.

Referring to FIG. 16 and FIG. 18, a description will now be given to the signal supplying operation for turning the pixel P1 OFF and the pixel P2 ON, which is the opposite case from the one illustrated in FIG. 17, in the transmissive display mode according to the same data signal as the data signal for the reflective display mode illustrated in FIG. 17.

In FIG. 16 and FIG. 18, first, when the scanning signal is supplied via the scanning signal line 110' to the pixel P1 from a scanning signal potential supplying means (refer to FIG. 5), the scanning electrode potential Vcom1 is set at the high level in the form of a pulse over one horizontal scanning period. When the data signal for "black" is supplied to the pixel row including the pixels P1 and P2 via the data signal converting means, the data signal potential supplying means (refer to FIG. 5), and the data signal line 113' in synchronization with the foregoing scanning signal, the signal electrode potential Vseg of the respective pixels of that row is set to the level of Voff on the positive side in the chart because the data signal has been inverted by the data signal converting means. Accordingly, the liquid crystal applied voltage (Vcom1-Vseg) exceeding a threshold value is not supplied to the liquid crystal capacitor 1202 in the pixel P1. In other words, since the data signal converting means (refer to FIG. 5) performs inversion on the data signal corresponding to "black," the liquid crystal layer in the pixel P1 is placed in a voltage non-applied state, thus providing the black display in the transmissive display mode.

On the other hand, when the scanning signal is supplied to the pixel P2 via the scanning signal line 110' from the scanning signal potential supplying means (refer to FIG. 5), the scanning electrode potential Vcom2 is set to the high level in the form of a pulse over one horizontal scanning period. When a data signal corresponding to "white" is supplied to the pixel row including the pixels P1 and P2 via the data signal converting means, the data signal potential supplying means (refer to FIG. 5), and the data signal line 113' in synchronization with the scanning signal, the signal electrode potential Vseg of the respective pixels of that row is set to the level of Von on the negative side in the chart because the data signal has been inverted by the data signal converting means. Accordingly, the liquid crystal applied voltage (Vcom2-Vseg) exceeding the threshold value is supplied to the liquid crystal capacitor 1202 in the pixel P2. In other words, since the data signal converting means (refer to FIG. 5) performs inversion on the data signal corresponding to "white," the liquid crystal layer in the pixel P2 is placed in a voltage-applied state, thus providing the white display in the transmissive display mode.

Thus, according to the simple matrix drive in this embodiment, the data signal is inverted by the data signal converting means shown in FIG. 5 depending on the ON/OFF state; hence, the liquid crystal applied voltage in each pixel is inverted via the data signal potential supplying means, the data signal line, and the pixel TFT according to the ON/OFF state. As a result, this embodiment is able to provide the display free of the positive-negative inversion upon the switching between the reflective display mode and the transmissive display mode.

In the fourth embodiment, since the liquid crystal panel is driven by the simple matrix, an STN liquid crystal is used more preferably than a TN liquid crystal. Therefore, it is desirable to employ a retardation film or a phase different plate to avoid the coloring for which the STN liquid crystal is usually responsible. Such a configuration will be described with reference to FIG. 19. In FIG. 19, the identical components as those in the first embodiment shown in FIG. 4 will be assigned identical reference numerals and the explanation thereof will be omitted.

In FIG. 19, a liquid crystal device is equipped with an STN liquid crystal panel 305' having a sandwiched STN liquid crystal layer 303'. A retardation film (phase difference plate) 303*a* is disposed between an upper glass plate 302 of the liquid crystal panel 305' and a polarizer 301. As the retardation film 303*a*, various types of materials which have been publicly known may be used, and obviously, a phase difference plate may be used for this purpose. Such a configuration makes it possible to solve the coloring problem attributable to the STN liquid crystal layer 303', thus permitting reflective display or transmissive display with higher image quality.

(Fifth Embodiment)

A fifth embodiment of the present invention will be described with reference to FIG. 20.

The fifth embodiment is electronic equipment that employs the transflective type display devices in the first through fourth embodiments set forth above as a display.

Figure 20:
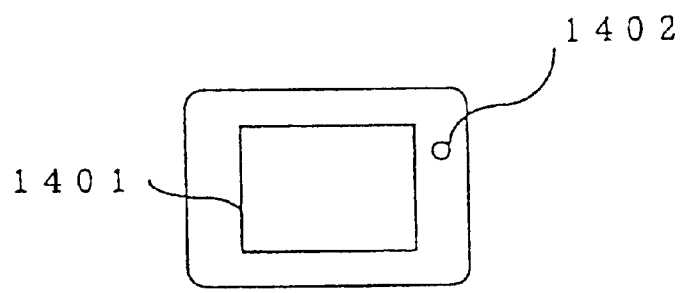
FIG. 20 is a schematic top plan view of electronic equipment of a fifth embodiment in accordance with the present invention.

FIG. 20 is a schematic diagram showing the electronic equipment of the fifth embodiment.

In FIG. 20, the electronic equipment is a PDA (Personal Digital Assistant) configured as a type of portable information terminal; it is provided with a transflective type display device 1401 to which a tablet has been attached as an input device, and a switch 1402 for switching a backlight to ON or OFF. Hitherto, a reflective type monochromic display device or a transmissive type display device has been frequently used for a PDA. As in the case of this embodiment, however, using the transflective type display device provides such advantages as the visibility that is not influenced by environments, and lower power consumption.

(Sixth Embodiment)

In the embodiments discussed above, it has been possible to provide the reflective display and the transmissive display while avoiding the occurrence of the positive-negative inversion by inverting data signals. It is still difficult, however, to obtain an approximately identical display luminance because the optical paths are different between the reflective display and the transmissive display.

Figure 21:
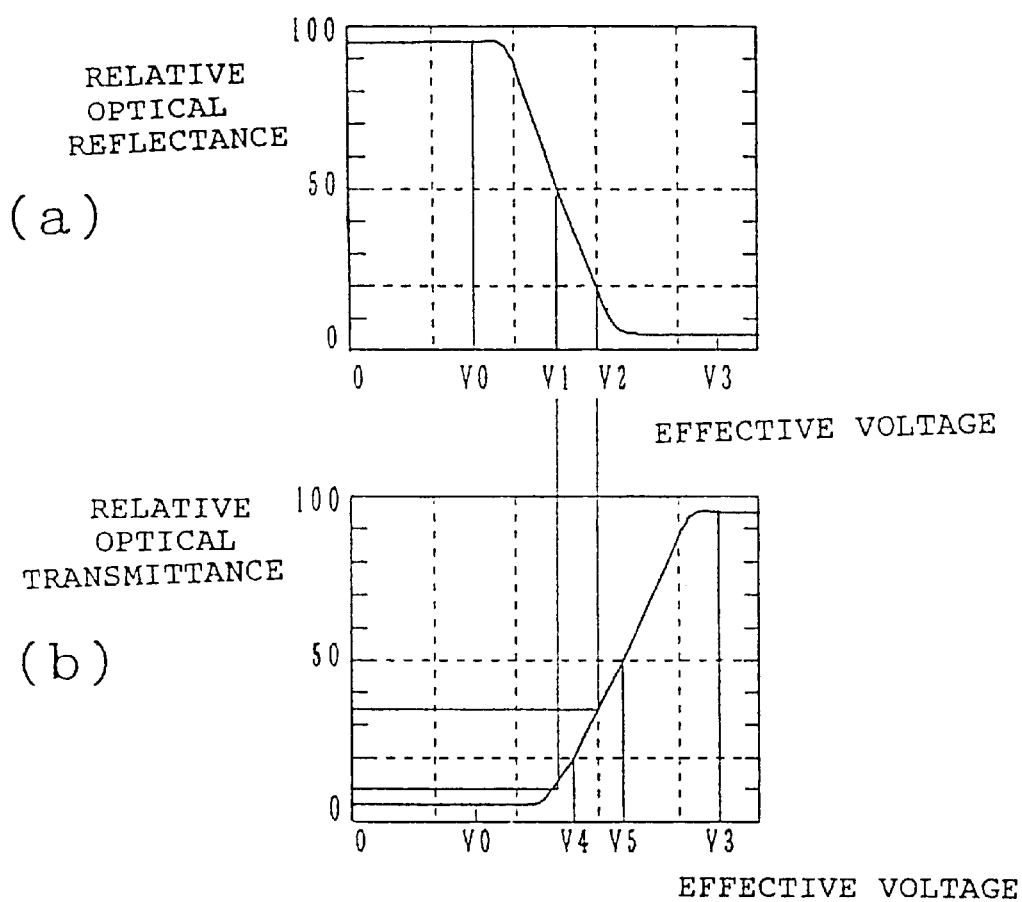
FIG. 21 shows charts illustrative of the relationships between effective voltage and the intensity of light in the liquid crystal panels of the respective embodiments in accordance with the present invention.

FIG. 21 shows the results of the detailed investigation on the relationship between the effective voltage applied to a liquid crystal to drive the liquid crystal and light intensity in a transflective liquid crystal device. FIG. 21 shows the characteristic of light intensity in relation to the effective voltage in the transflective liquid crystal device shown in FIG. 1; FIG. 21(*a*) illustrates a characteristic of the relative optical reflectance in relation to the effective voltage in a reflective display mode, and FIG. 21(*b*) illustrates a characteristic of the relative optical transmittance in relation to the effective voltage in a transmissive display mode. In both FIG. 21(*a*) and FIG. 21(*b*), the axis of abscissa indicates the effective voltage applied to the liquid crystal. The axis of ordinate of FIG. 21(*a*) indicates the relative optical reflectance in the reflective display mode, and the axis of ordinate of FIG. 21(*b*) indicates the relative optical transmittance in the transmissive display mode.

As it is obvious from FIG. 21, the positive-negative inversion takes place when switching between the reflective display mode and the transmissive display mode in accordance with the principle discussed in conjunction with FIG. 1. The rate of change, i.e. the gradient, of the intensity of light in relation to the rate of change in the effective voltage is larger in the reflective display mode than in the transmissive display mode. Therefore, an image with higher fidelity can be reproduced by changing the effective voltage applied to liquid crystal, depending upon whether the display mode is transmissive or reflective, i.e. whether a light source of the semi-transmissive liquid crystal device is ON or OFF.

Based on the aspect set forth above, in the following sixth and seventh embodiments, the effective voltage to be applied to the liquid crystal in the reflective display mode and the transmissive display mode is changed to stabilize the display luminance that tends to differ due to the difference in the optical path between the reflective display mode and the transmissive display mode.

Figure 22:
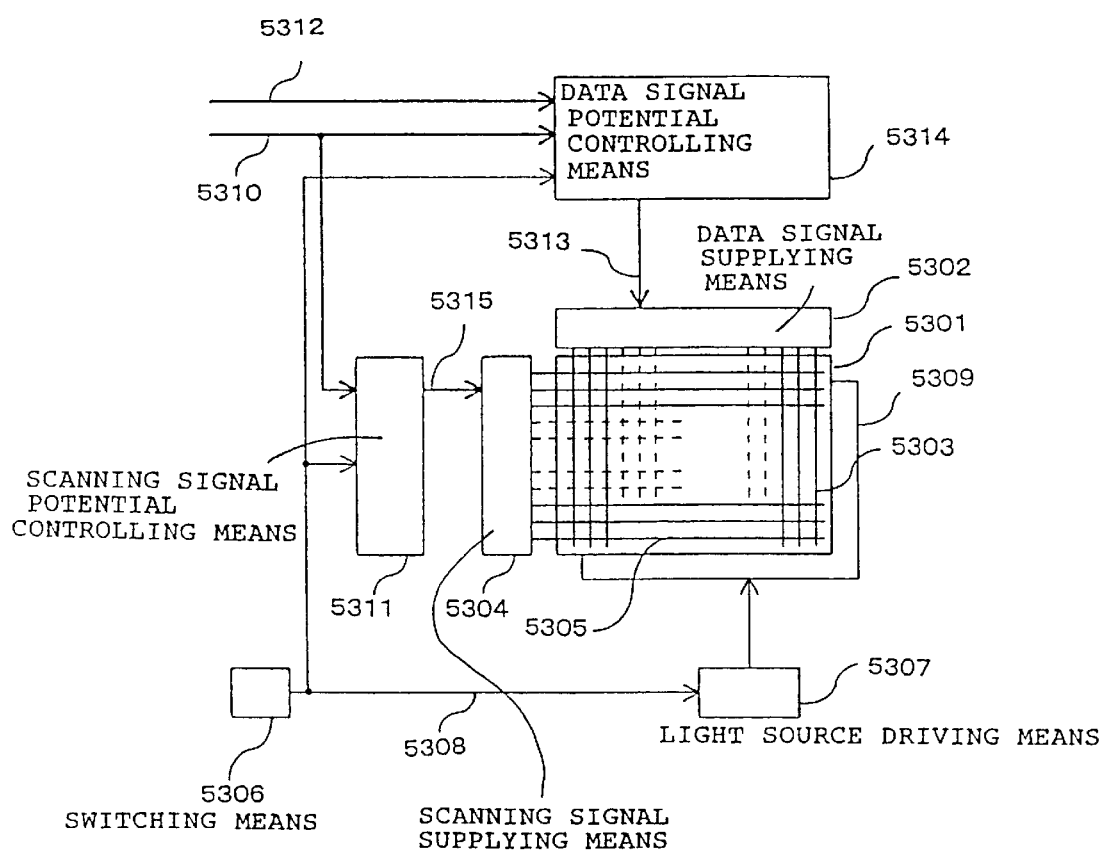
FIG. 22 is a block diagram showing a display device incorporating a driving device of a sixth embodiment in accordance with the present invention.

Referring to FIG. 22, a liquid crystal device in accordance with the sixth embodiment will now be described. FIG. 22 is a general block diagram showing the liquid crystal device in accordance with the present invention.

In FIG. 22, formed on a liquid crystal panel 5301 are a data signal electrode 5303 to which data signals are supplied from a data signal supplying means 5302, and a scanning electrode 5305 to which scanning signals are supplied from a scanning signal supplying means 5304. A dot is formed at each intersection of the data signal electrode 5303 and the scanning electrode 5305, and a potential difference between the potential of the signal supplied to the data signal electrode 5303 and the potential of the signal supplied to the scanning electrode 5305 is applied as the effective voltage to the liquid crystal corresponding to each dot.

An example of a light source controlling means is constituted by a ON/OFF state switching means 5306 and a light source driving means 5307; the light source driving means 5307 turns the light source 5309 ON in response to an ON/OFF state signal 5308 from the ON/OFF state switching means 5306.

Further, an example of a driving voltage controlling means is constituted by a scanning signal potential controlling means 5311 that supplies a scanning electrode driving control signal 5315 to the scanning potential supplying means 5304 in response to a display controlling signal 5310 and the ON/OFF state signal 5308, and a data signal potential controlling means 5314 that supplies a data signal electrode driving control signal 5313 to the data signal supplying means 5302 in response to an image signal 5312, a display controlling signal 5310, and the ON/OFF state signal 5308.

The scanning electrode driving control signal 5315 serves as a generic term for the controlling signals required for the scanning signal supplying means 5304 to drive the scanning electrode 5305, such controlling signals including scanning signals, start signals, and scanning clock signals supplied to the scanning electrode 5305. Likewise, the data signal electrode driving control signal 5313 serves as a generic term for the controlling signals required for the data signal supplying means 5302, such controlling signals including data signals, display signals, gray scale controlling signals, and clock signals supplied to the data signal electrode 5303.

These data signal potential controlling means 5314 and the scanning signal potential controlling means 5311 change the data signal electrode driving control signal 5313 and the scanning electrode driving control signal 5315 according to the ON/OFF state signal 5308 so as to generate a control signal for applying the effective voltage, which provides approximately the same reflectance and transmittance, to the liquid crystal in response to an image signal 5312 that is received.

Figures 23, 24:
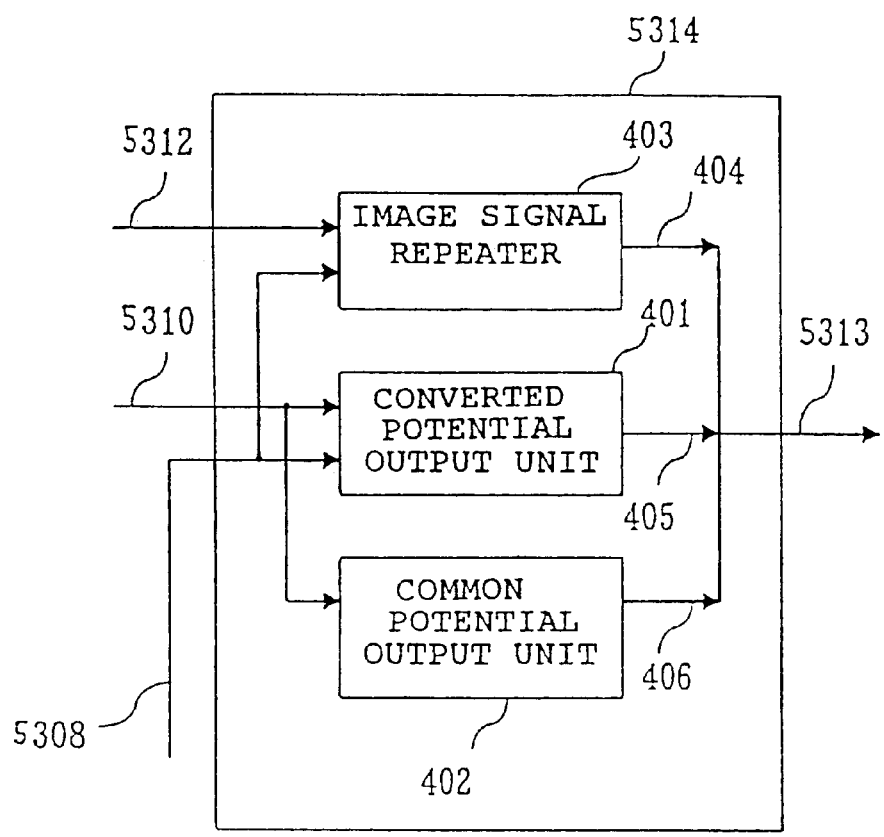
FIG. 23 is a block diagram showing a data signal potential controlling means mounted on the display device of the sixth embodiment in accordance with the present invention.
FIG. 24 is a table showing the intensity of light, the effective voltage in a reflective display mode, and the effective voltage in a transmissive display mode with respect to image data in the display device of the sixth embodiment in accordance with the present invention.

FIG. 23 is a block diagram for describing in more detail the data signal potential controlling means 5314 shown in FIG. 22.

In FIG. 23, the data signal potential controlling means 5314 is equipped with three controlling means, namely, a converted potential output unit 401, a common potential output unit 402, and an image signal repeater 403. The image signal repeater 403 receives the image signal 5312 and outputs a display signal 404. In this case, the image signal and the display signal are theoretically the same, and the image signal repeater 403 is used primarily for adjusting the level when outputting the display signal to the data signal supplying means. The converted potential output unit 401 generates a data signal 405 required for driving the data signal electrode according to the ON/OFF state signal 5308. The common potential output unit 402 generates a common control signal 406 that stays constant regardless of the ON/OFF state signal. The common control signal 406 is composed primarily of a shift clock signal, an AC signal, and a start signal. Input to the data signal supplying means is the data signal electrode driving control signal 5313 that includes the display signal 404, the data signal 405, and the common control signal 406.

Based on the relationship between the effective voltage and the intensity of light shown in FIG. 21, the effective voltages required for the reflective display mode and the transmissive display mode for the image signals are as indicated by the table in FIG. 24.

In the table of FIG. 24, if an image signal is formed of four gray scale steps to provide display in the intensity of light of 95%, 50%, 20%, and 5%, respectively, then the effective voltages required for the liquid crystal corresponding to the respective dots are V0, V1, V2, and V3 in the reflective display mode, or V3, V5, V4, and V0 in the transmissive display mode as shown in the table. Thus, the effective voltage applied to a liquid crystal layer is changed depending on whether the mode is the reflective display mode or the transmissive display mode by using the converted potential output unit 401 in FIG. 23.

Figure 25:
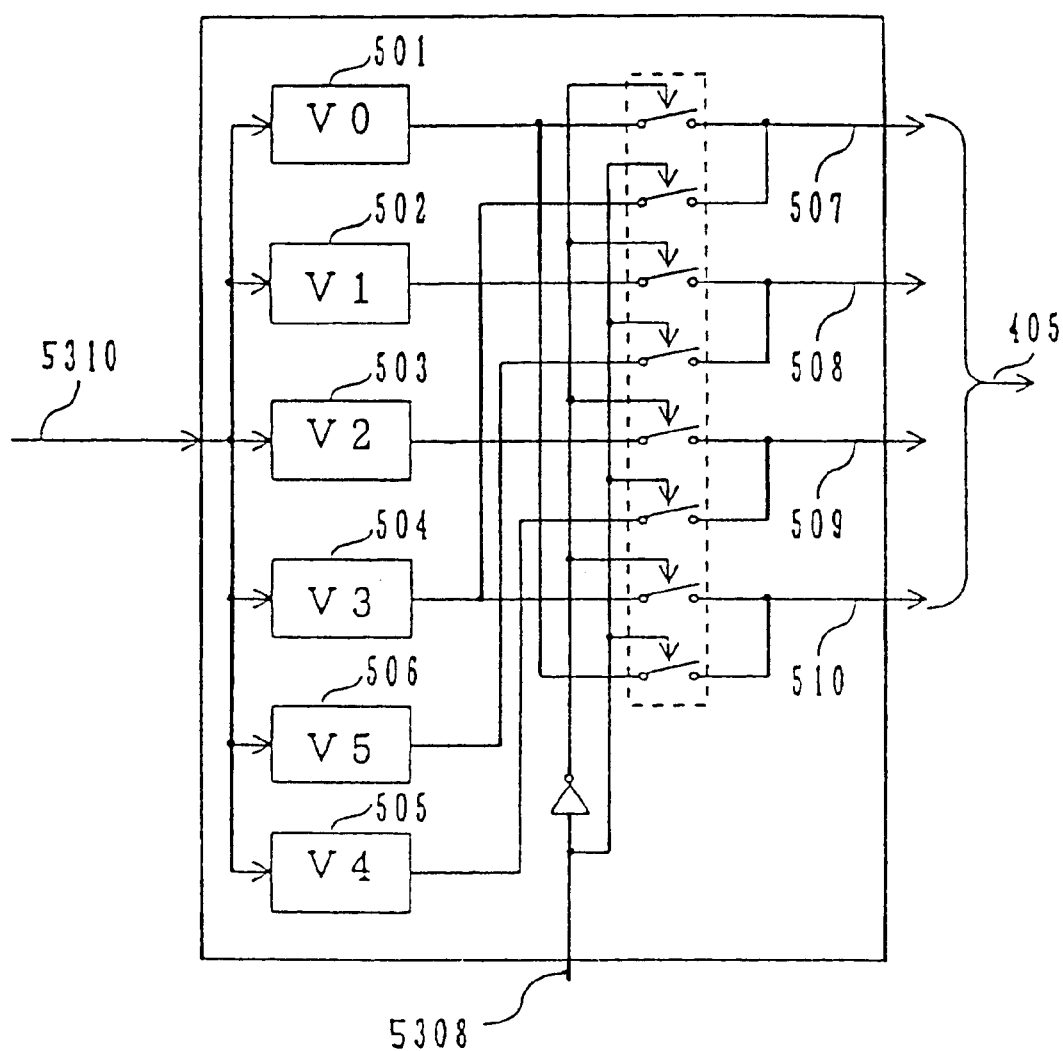
FIG. 25 is a circuit diagram showing a converted potential output unit mounted on the display device of the sixth embodiment in accordance with the present invention.

FIG. 25 is a block diagram illustrating an example of the converted potential output unit 401 in FIG. 23.

In FIG. 25, the converted potential output unit is equipped with potential generating circuits 501, 502, 503, 504, 505, and 506 for generating the potentials necessary to apply the effective voltages V0, V1, V2, V3, V4, and V5 to the liquid crystal, respectively. A data signal 507 is applied for an image signal "00"; a data signal 508 is applied for an image signal "01"; a data signal 509 is applied for an image signal "10"; and a data signal 510 is applied for an image signal "11". If a switch 506 which turns ON when the control signal is "1" is used, then a data signal is supplied to the data signal electrode supplying means such that V0 is applied as the effective voltage for the liquid crystal when the image signal "00" is received and V3 is applied when the image signal "11" is received when the ON/OFF state signal is "0", which means OFF. Further, the data signal 405 is changed so that V3 is applied as the effective voltage for the liquid crystal when the image signal "00" is received and V0 is applied when the image signal "11" is received if the ON/OFF state signal 5308 is "1", which means ON. Likewise, even when the display signal is of an intermediate value, it is possible to achieve smooth image display that satisfies the relational conditions shown in the table of FIG. 24 and provide the same intensity of light in the transmissive display mode and the reflective display mode in all gray scale steps. In this embodiment, the control of the effective voltages has been described by referring to the case where the potential level of the data signals supplied to the data signal electrode is changed to drive the data signal electrode; however, general control methods involving pulse width, frame modulation, area gray scale or the like used for liquid crystal devices can also be applied to this embodiment.

Figure 26:
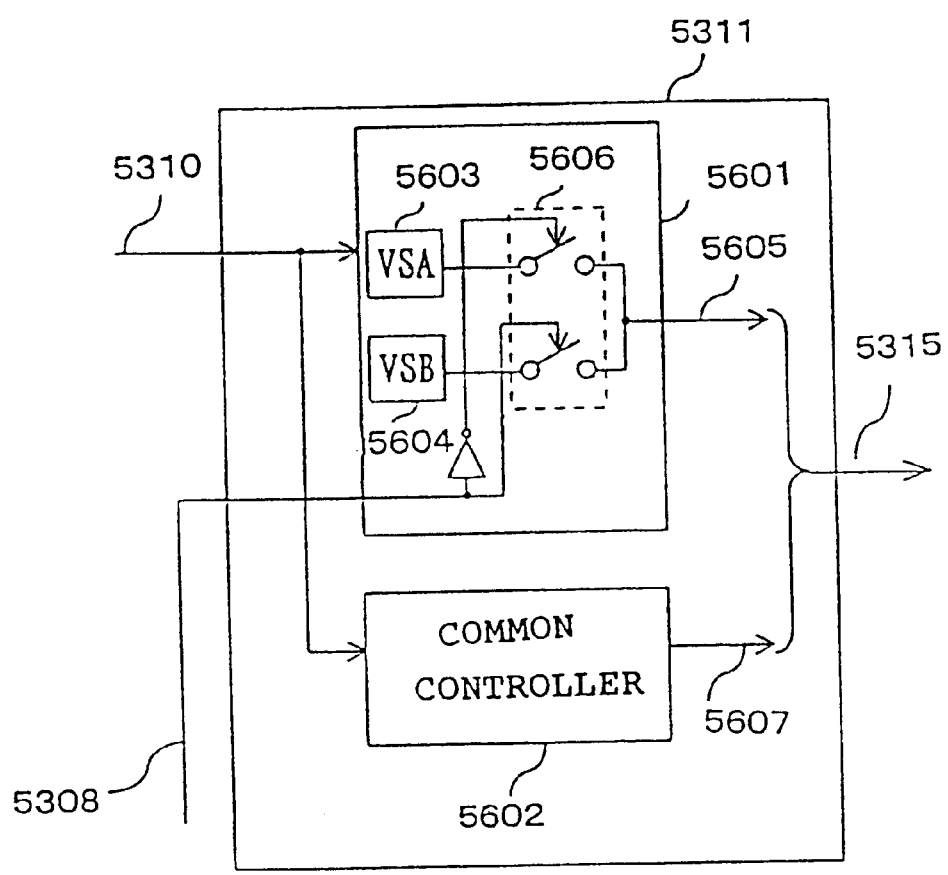
FIG. 26 is a block diagram showing a scanning signal potential controlling means mounted on the display device of the sixth embodiment in accordance with the present invention.

FIG. 26 is a block diagram for describing in further detail the scanning signal potential controlling means 5311 shown in FIG. 22.

In FIG. 26, the scanning signal potential controlling means 5311 is formed of a converted potential output unit 5601 that changes the potential of a signal supplied to the scanning electrode according to the ON/OFF state signal 5308 and a common controlling unit 5602 that generates a control signal that stays constant regardless of the ON/OFF state signal. In the transflective liquid crystal device, there are some cases where bright display is required in the reflective display mode and display with higher contrast is required at the cost of brightness in the transmissive display mode. In such a case, it is difficult to control the display state by the data signal potential controlling means shown in FIG. 25 alone; therefore, the potential of a signal 5605 that is output from the converted potential output unit 5601 and input to the scanning signal supplying means 5304 is changed according to the ON/OFF state signal 5308. The converted potential output unit 5601 includes potential generating circuits 5603 and 5604 for scanning potentials VSA and VSB, respectively, in the reflective display mode and the transmissive display mode, and a switch 5606 for switching them. FIG. 26 illustrates an example wherein the potential of the signal supplied to the scanning signal supplying means is changed to the scanning potential VSA in the reflective display mode or to the scanning potential VSB in the transmissive display mode in accordance with the ON/OFF state signal 5308. The common controlling unit 5602 issues necessary control signals such as scanning clock signals, scanning start signals, and AC signals required for selecting scanning electrodes in sequence; it generates a common control signal 5607 that is fixed regardless of whether a light source is ON or OFF. A scanning electrode control signal 5315 is formed of a signal output from the common controlling unit 5602 and a signal output from the converted potential output unit 5601; it is supplied to the scanning signal supplying means.

(Seventh Embodiment)

Figure 27:
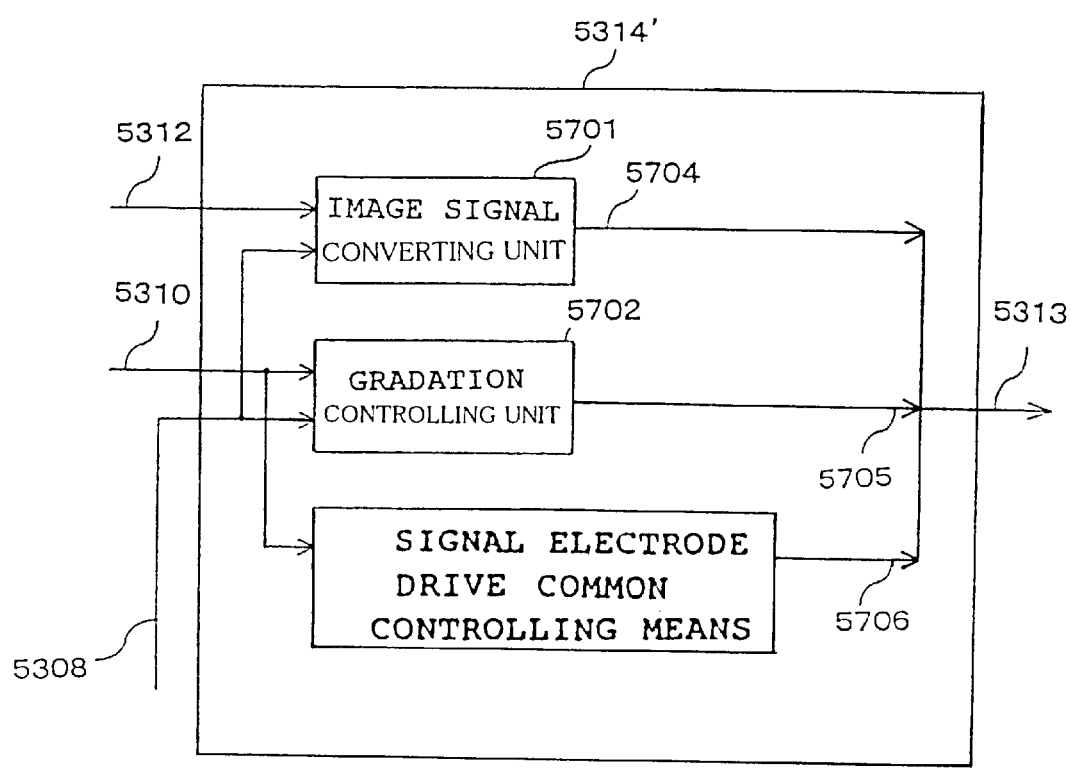
FIG. 27 is a block diagram showing a data signal potential controlling unit mounted on the display device of a seventh embodiment in accordance with the present invention.

This embodiment illustrates another example of the data signal potential controlling means 5314 shown in FIG. 22. FIG. 27 is a block diagram of a data signal potential controlling means 5314' in this embodiment.

In FIG. 27, the data signal potential controlling means 5314' is provided with an image signal converting unit 5701, a gray scale controlling unit 5702, and a signal electrode driving common controlling means 5703. The image signal converting unit 5701 converts an image signal 5312 into a display signal 5704 in accordance with an ON/OFF state signal 5308 and outputs it to a data signal supplying means. The image signal converting unit 5701 has a data inverting function and it is also able to perform conversion into a display signal of a greater number of bits than the number of bits of an image signal. The gray scale controlling unit 5702 generates a gray scale control signal 5705 in accordance with the ON/OFF state signal 5308. The signal electrode driving common controlling means 5703 generates a common control signal 5706 that stays constant independently of an ON/OFF state signal. The common control signal 5706 is formed mainly of a shift clock signal, an AC signal, and a start signal. Because of the configuration of the liquid crystal device shown in FIG. 1 and the relationship between the effective voltages and the reflectance and transmittance shown in FIG. 21, contrast reversal takes place in display image and the intensity of light is also different between the reflective display mode and the transmissive display mode for the same display signal, i.e. the same effective voltage. The simplest example of the image signal converting unit is represented by the function for inverting image signals. The function for inverting data can be accomplished by taking the exclusive OR of the ON/OFF state signal 5308 and the image signal 5312, making it possible to avoid the contrast reversal in the display when switching between the reflective display mode and the transmissive display mode. Even when the image signal 5312 is composed of multiple bits having halftones, the positive-negative inversion can be avoided by taking the exclusive OR of each bit of the image signal and the ON/OFF state signal. If the image signal is composed of four gray scale steps to provide display in the intensity of light of 95%, 50%, 20%, and 5%, respectively, then the effective voltages to be applied to respective liquid crystals in the reflective display mode are V0, V1, V2, and V3 shown in FIG. 21. In the transmissive display mode, data inversion is carried out at the time of reflection. Accordingly, the effective voltages applied in response to the image signal are reversed from those at the time of reflection; when the image signal indicates "00", then V3 is applied, and when the image signal indicates "11", then V0 is applied. The relationships between the applied voltages and the intensity of light observed when data is inverted in the reflective display mode and the transmissive display mode are shown in the table of FIG. 28 and the table of FIG. 29.

In the table of FIG. 29, the display signals at the time of transmission represent the data that has been inverted by the image signal converting unit 5701 in comparison with the signals shown in the table of FIG. 28. It can be seen, however, that if the image signals are of an intermediate value such as "01" or "10", then the intensity of light is different if the same potential is supplied to the data signal supplying means 5302. As it has been described in the sixth embodiment, based on the characteristic of transmittance in relation to effective voltage shown in FIG. 21, the voltage for providing the transmittance of 50% is V5 and the effective voltage for providing the transmittance of 20% is V4 in the transmissive display mode. Hence, the effective voltage applied to liquid crystal in reflection or transmission is changed by using the gray scale controlling unit 5702 shown in FIG. 27.

Figure 30:
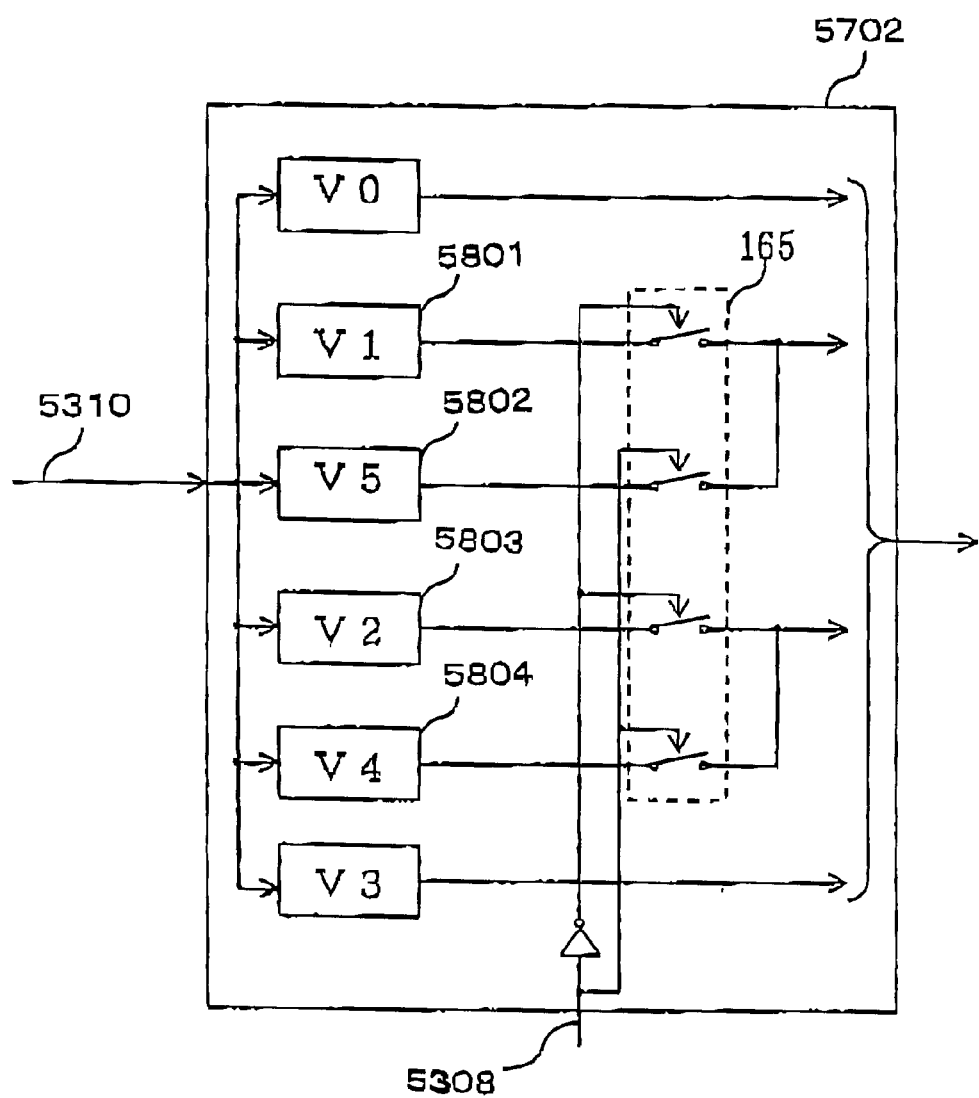
FIG. 30 is a block diagram showing a gray scale controlling unit mounted on the display device of the seventh embodiment in accordance with the present invention.

FIG. 30 is a block diagram showing an example of the gray scale controlling unit 5702 shown in FIG. 27.

In FIG. 30, the gray scale controlling unit 5702 has been configured so that it generates a gray scale potential that determines the effective voltage to be applied to a liquid crystal and changes the gray scale potential to be supplied to the data signal supplying means in accordance with the ON/OFF state signal. To be more specific, the gray scale controlling unit 5702 is equipped with gray scale potential generating circuits 5801, 5802, 5803, and 5804 to supply the potentials, which are for applying the respective effective voltages V1, V5, V2, and V4 to the liquid crystal, to the data signal supplying means. If a switch 165 that turns ON when the control signal is "1" is used, the gray scale potential for V1 is selected in response to the image signal "01" when the ON/OFF state signal is "0" indicative of OFF, or the gray scale potential for V2 is selected in response to the image signal "10". Likewise, when the ON/OFF state signal is "1" indicative of ON, the gray scale voltage for V5 is selected for the image signal "01" or the gray scale voltage for V4 is selected for the image signal "10". Supplying the gray scale voltages corresponding to these respective display signals to the data signal supplying means causes the relationship between the intensity of light and the effective voltages shown in the table of FIG. 24 to be satisfied, providing the same intensity of light in both transmissive display mode and reflective display mode. In this embodiment, a description has been given to a case where the gray scale control is accomplished by voltage; however, general gray scale control methods employed for liquid crystal devices that involve pulse width, frame modulation, or area gray scale for the gray scale control are also applicable to the present invention.

(Eighth Embodiment)

An eighth embodiment in accordance with the present invention will be described with reference to FIG. 31 and FIG. 32.

The eighth embodiment comprises various types of electronic equipment that include the liquid crystal devices of the first through seventh embodiments as the display parts.

Figure 31:
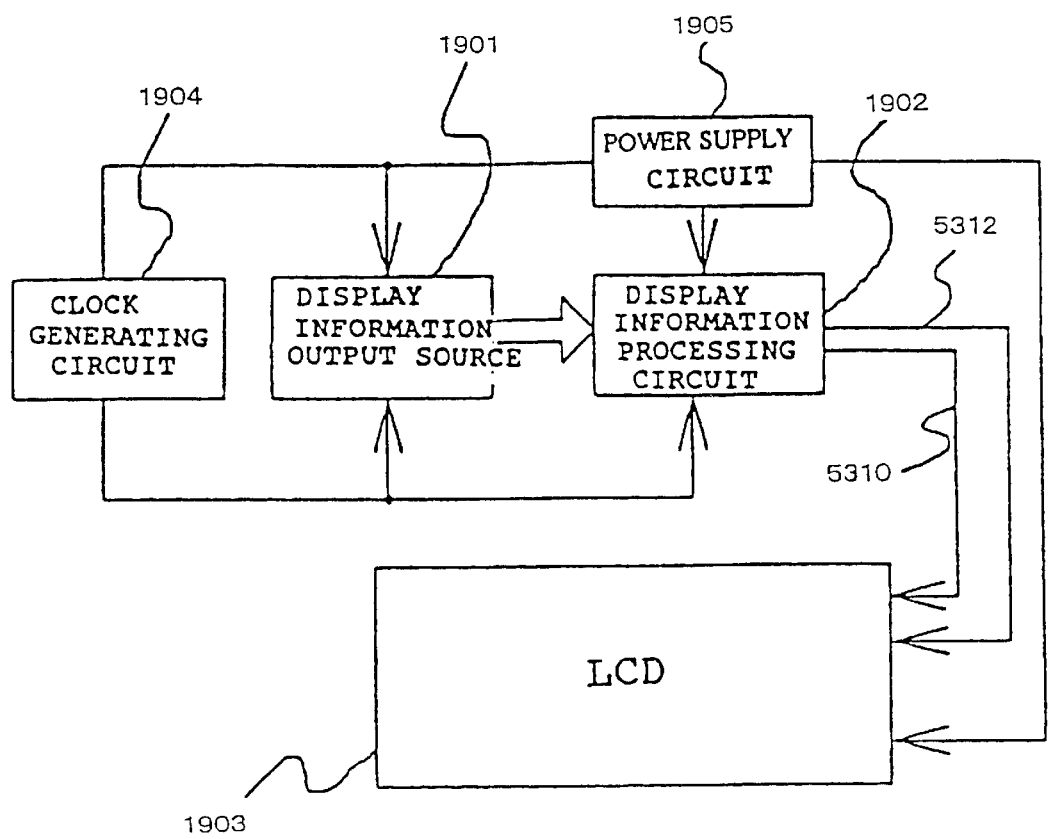
FIG. 31 is a block diagram showing electronic equipment of an eighth embodiment in accordance with the present invention.

FIG. 31 shows an example of the electrical connection in various types of electronic equipment.

In FIG. 31, the electronic equipment includes a display information output source 1901, a display information processing circuit 1902, a liquid crystal device 1903, a clock generating circuit 1904, and a power source circuit 1905.

The display information output source 1901 includes a memory circuit and a tuning circuit, and it outputs image signals according to the clock signals received from the clock generating circuit 1904. The display information processing circuit 1902 may include, for example, an amplifier circuit, a gamma correction circuit, a clamp circuit, and an AD converter. The liquid crystal device 1903 is the liquid crystal device of any one of the first through seventh embodiments. The power source to be supplied to the respective circuits is given by the power source circuit 1905.

Figure 32:
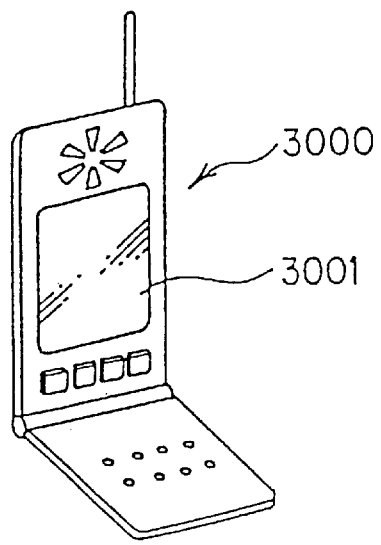
FIGS. 32(a), (b), and (c), respectively, are perspective views of various types of specific examples of the electronic equipment of the eighth embodiment in accordance with the present invention.
Figure 32:
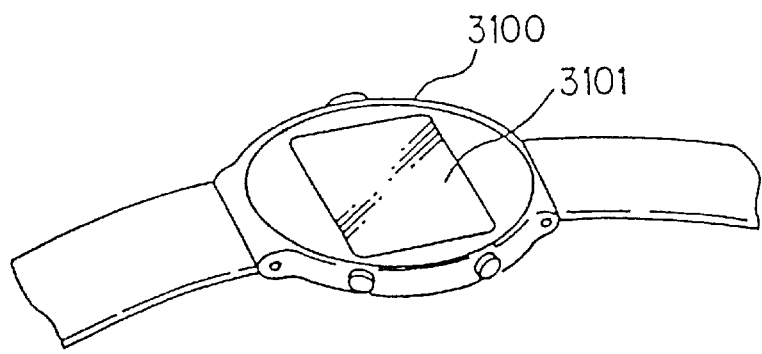
Figure 32:
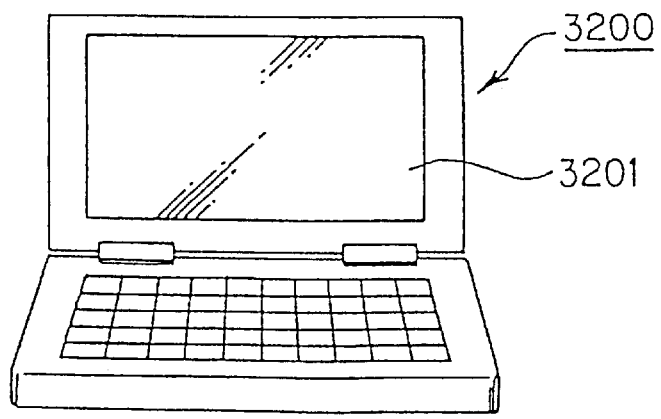
Figure 33:
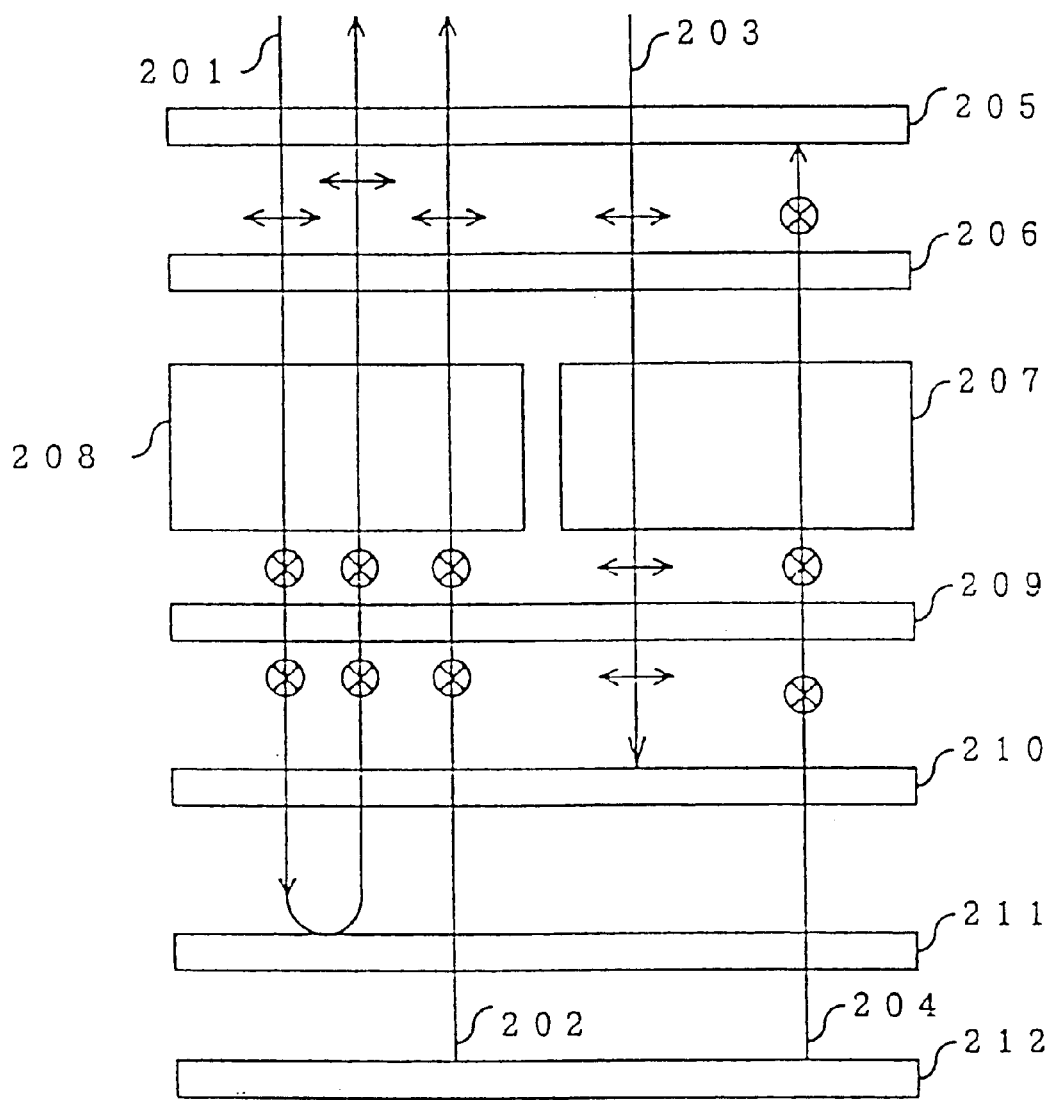
FIG. 33 is a schematic sectional view illustrative of the principle of operation in a reflective display mode and a transmissive display mode in a conventional display device.

Applying the display device of any one of the embodiments as an example of the electronic equipment to, for instance, a display part 3001 of a portable telephone 3000 as shown in FIG. 32(*a*) makes it possible to achieve an energy-saving portable telephone that is able to provide reflective type and transmissive type display with stable display luminance, and free of the positive-negative inversion while maintaining bright display regardless of whether it is used under the sun, in a shade, or indoors.

As another example of the electronic equipment, applying the display device to a display part 3101 of a watch 3100 as shown in FIG. 32(*b*) makes it possible to achieve an energy-saving watch that is able to provide reflective type and transmissive type display with stable display luminance, and free of the positive-negative inversion while maintaining bright display regardless of whether it is used under the sun, in a shade, or indoors.

Further, as yet another example of the electronic equipment, applying the display device to a display screen 3201 of a personal computer (or information terminal) 3200 as shown in FIG. 32(c) makes it possible to achieve an energy-saving personal computer that is able to provide reflective type and transmissive type display with stable display luminance, and free of the positive-negative inversion while maintaining bright display regardless of whether it is used under the sun, in a shade, or indoors.

The liquid crystal display devices of the embodiments can be also applied to other electronic equipment such as a liquid crystal television, a viewfinder type or monitor direct view type videotape recorder, a car navigation device, an electronic pocketbook, a hand-held calculator, a word processor, an engineering workstation (EWS), a videophone, a POS terminal, and an apparatus equipped with a touch panel, in addition to the electronic equipment shown in FIG. 32.

As explained in detail above, the embodiments enable brighter display especially in the reflective display mode than the display available with a conventional display device that employs two polarizers. Unlike the display device employing the reflective polarizer that has been disclosed in the prior application by the inventors of the present application, the display devices of the embodiments do not develop the positive-negative inversion upon the switching between the reflective display mode and the transmissive display mode, thus ensuring good display. Hence, it is possible to obtain good display not only in a monochromic or dichroic display but also in a full-color display in both reflective display mode and transmissive display mode. Furthermore, a transflective type display device with stable display luminance in both reflective display and transmissive display can be accomplished.

Although the present invention has been described in conjunction with various embodiments and the accompanying drawings, the present invention should not be deemed to be limited to these embodiments. The present invention can be embodied in various other forms. In particular, for the gray scale controlling unit in accordance with the seventh embodiment, it is possible to adopt a pulse width modulation method, a voltage modulation method, a frame modulation method, an area modulation method, or a combination of these used as the gray scale controlling technique for a liquid crystal device. Further, in the basic configuration of the liquid crystal device shown in FIG. 1, the first polarized light separating means may alternatively be composed of a reflective polarizer rather than a polarizer, just like the second polarized light separating means.

The liquid crystal panel in any one of the embodiments may be replaced by any type of liquid crystal panel including the simple matrix type or the active type in which a three-terminal element represented by the TFT element or a two-terminal nonlinear element represented by a D-TFD (MIM) element is disposed at each intersection of a data signal line and a scanning signal line. In other words, according to the present invention, the type of the display panel is not restricted, and it is possible to prevent the positive-negative inversion upon the switching between the reflective display mode and the transmissive display mode and to provide the same display luminance by working on the driving device for driving a display panel rather than reworking the display panel, thus providing great advantages in practical use.

It is preferable to apply the present invention especially to a liquid crystal device; however, the present invention can be also applied to other display devices making use of polarization.

The liquid crystal devices and electronic equipment in accordance with the present invention are not limited to those explained in the eighth embodiment; they encompasses a variety of electronic equipment including at least the liquid crystal devices in accordance with the present invention.

Industrial Applicability

The display device in accordance with the present invention employs a liquid crystal device as the variable transmission polarization axis means; it is free of the positive-negative inversion upon the switching between the reflective display mode and the transmissive display mode; and it provides approximately the same intensity of light also for each halftone, making it usable as a display device working as both reflective type and transmissive type that provides bright display especially in the reflective display mode. The display device in accordance with the present invention is also usable as a display device that employs a variable transmission polarization axis means other than the liquid crystal device. In addition, the electronic equipment in accordance with the present invention is configured using such display devices, making it usable as energy-saving electronic equipment or the like capable of providing bright reflective display and transmissive display with even light intensity and also capable of preventing the positive-negative inversion.

What is claimed is:

1. A display device that displays in each of a reflective display mode using external light and a transmissive display mode using internal light, a gray scale of the display device being prepared according to image data prepared for use in each mode thereof, the display device comprising:

a first polarized light separating mechanism that permits a first light component polarized to a first direction to pass therethrough and permits a light component other than the first light component to reflect there against or be absorbed thereinto;

a second polarized light separating mechanism that permits a second light component polarized to a second direction to pass therethrough and permits a light component other than the second light component to reflect thereagainst or be absorbed thereinto;

a variable transmission polarization axis mechanism disposed between the first polarized light separating mechanism and the second polarized light separating mechanism, the variable transmission polarization axis mechanism having a transmission polarization axis that is switchable between the reflective display mode and the transmissive display mode and being changeable to range from the first direction to the second direction according to the image data in each of the reflective and transmissive modes; and a driving circuit connected to the variable transmission polarization axis mechanism, the driving circuit being operable to apply first image data to the variable transmission polarization axis mechanism in one of the reflective and transmissive display modes, and to apply second image data inverse in logic to the first image data to the variable transmission polarization axis mechanism in the other of the reflective and transmissive display modes.

2. A transflective display device according to claim 1, the driving voltage changing means changing the image data in synchronization with an ON/OFF control signal instructing the ON/OFF state of the light source.

3. A display device according to claim 1, the variable transmission polarization axis mechanism comprising:

a data signal line;

a scanning signal line; and a driven region formed at an intersection of the data line and the signal line, the transmission polarization axis of the driven region being controlled by the driving voltage applied between the data line and the signal line.

4. A display device according to claim 3, the driving circuit including a data signal potential supplying mechanism that supplies an electrical potential of a data signal to the variable transmission polarization axis mechanism, and the driving circuit including a data signal converting mechanism for changing the data signal applied to the data line in synchronization with an ON/OFF control signal controlling an ON/OFF state of the internal light.

5. A display device according to claim 4, the data signal converting mechanism including an inverting mechanism for inverting the data signal in synchronization with the ON/OFF control signal.

6. A display device according to claim 3, further comprising a nonlinear element for the intersection.

7. A display device according to claim 3, the driving circuit including:

a scanning signal supplying mechanism for supplying a scanning signal; and a data signal supplying mechanism for supplying a data signal, at least one of the scanning signal and the data signal being controlled by a driving voltage changing mechanism in synchronization with an ON/OFF control signal controlling an ON/OFF state of the internal light.

8. A display device according to claim 7, the driving voltage changing mechanism including:

a scanning signal potential controlling mechanism for changing an electrical potential of the scanning signal in synchronization with the ON/OFF control signal.

9. A display device according to claim 8, the scanning signal potential controlling mechanism including:

a first common potential output unit for outputting a predetermined electrical potential; and a first converted potential output unit for outputting an electrical potential based on the ON/OFF control signal, the scanning signal potential controlling mechanism outputting a sum of electrical potentials from the first common potential output unit and the first converted potential output unit to the scanning signal supplying mechanism.

10. A display device according to claim 7, the driving voltage changing mechanism including:

a data signal potential controlling mechanism for changing the electrical potential of the data signal in synchronization with the ON/OFF control signal.

11. A display device according to claim 10, the data signal potential controlling mechanism including:

an image signal converting unit for converting an image signal corresponding to the image data and outputting an electrical potential of the converted image signal;

a third common potential output unit for outputting a predetermined electrical potential;

a gray scale controlling unit for outputting an electrical potential based on the ON/OFF control signal and an electrical potential corresponding to gray scale information of the image data; and the data signal potential controlling mechanism outputting a sum of electrical potentials from the image signal converting unit, the third common potential output unit, and the gray scale controlling unit to the data signal supplying mechanism.

12. A display device according to claim 1, the second polarized light separating mechanism comprising a reflective polarizer that allows the second light component polarized in the second direction to be transmitted, while the reflective polarizer reflects light components polarized in a direction orthogonal to the second direction.

13. A display device according to claim 12, the reflective polarizer comprising a laminate composed of a first layer having birefringence and a second layer that has a refractive index substantially equal to one of a plurality of refractive indexes of the first layer and that has no birefringence, the first and second layers being stacked alternately.

14. A display device according to claim 1, the second polarized light separating mechanism allowing the second light component polarized in the second direction to be transmitted with respect to the light in an almost entire wavelength range of a visible light region, while the second polarized light separating mechanism reflects a light component polarized in a direction orthogonal to the second direction.

15. A display device according to claim 1, the first polarized light separating mechanism comprising a polarizer for allowing the first light component polarized in the first direction to be transmitted and absorbing a light component polarized in a direction orthogonal to the first direction.

16. A display device according to claim 1, further comprising a semi-transmissive light absorption layer located between the second polarized light separating mechanism and a source of the internal light.

17. A display device according to claim 16, a transmittance of the semi-transmissive light absorption layer ranging from 5% to 80%.

18. A display device according to claim 1, further comprising a polarizing mechanism which has a transmission axis roughly aligned with the second direction and which is located between the second polarized light separating mechanism and a source of the internal light.

19. A display device according to claim 1, further comprising a transmissive light diffusion layer located between a source of the internal light and the second polarized light separating mechanism.

20. A display device according to claim 1, further comprising a color filter.

21. A display device according to claim 1, the driving circuit including:
   a scanning signal supplying mechanism for supplying a scanning signal; and
   a data signal supplying mechanism for supplying the data signal, at least one of the scanning signal and the data signal being controlled by a driving voltage changing mechanism in synchronization with an ON/OFF control signal controlling an ON/OFF state of the internal light.

22. Electronic equipment comprising the display device described in claim 1.

23. A driving method for a display device that displays in each of a reflective display mode using external light and a transmissive display mode using internal light, a gray scale of the display device being prepared according to image data for use in each mode thereof, the method comprising:
   providing a first polarized light separating mechanism that permits a first light component polarized to a first direction to pass therethrough and permits a light component other than the first light component to reflect thereagainst or be absorbed thereinto;
   providing a second polarized light separating mechanism that permits a second light component polarized to a second direction to pass therethrough and permits a light component other than the second light component to reflect thereagainst or be absorbed thereinto;
   disposing a variable transmission polarization axis mechanism between the first polarized light separating mechanism and the second polarized light separating mechanism, the variable transmission polarization axis mechanism having a transmission polarization axis that is switchable between the reflective display mode and the transmissive display mode and being changeable to range from the first direction to the second direction according to the image data in each of the reflective and transmissive display modes; and
   connecting a driving circuit to the variable transmission polarization axis mechanism and applying first image data from the driving circuit to the variable transmission polarization axis mechanism in one of the reflective and transmissive display modes, and applying second image data inverse in logic to the first image data from the driving circuit to the variable transmission polarization axis mechanism in the other of the reflective and transmissive display modes.

24. A driving method for a display device according to claim 23;
   the driving voltage changing step changing the driving voltage in synchronization with the ON/OFF control signal.

25. A driving method for a display device according to claim 27, the variable transmission polarization axis mechanism comprising:
   a data signal line for receiving a data signal;
   a scanning signal line for receiving a scanning signal; and
   a driven region formed at an intersection of the data line and the signal line,
   the driving voltage changing step changing an electrical potential of the data signal, according to the image data, supplied to the data signal line.

26. A driving method for a display device according to claim 25, the driving voltage changing step comprising:
   a scanning signal supplying step for supplying the scanning signal; and
   a data signal supplying step for supplying a data signal,
   at least one of the scanning signal and the data signal being controlled, in synchronization with the ON/OFF control signal, by the driving voltage changing mechanism.

27. A driving method for a display device according to claim 25,
   the driving step including a data signal potential supplying step that supplies an electrical potential of the data signal to the variable transmission polarization axis mechanism; and
   the driving voltage changing step including a data signal converting step for changing the data signal applied to the data line in synchronization with the ON/OFF control signal.

28. A driving method for a display device according to claim 27, the data signal converting step including an inverting step for inverting the data signal in synchronization with the ON/OFF control signal.

29. A driving method for a display device according to claim 26, wherein the driving voltage switching step includes a scanning signal potential controlling step that makes a setting so that a potential of the scanning signal supplied by the scanning signal supplying step when the light source is OFF is different from a potential of the scanning signal supplied when the light source is ON.

30. A driving method for a display device according to claim 26, wherein the driving voltage switching step includes a data signal potential controlling step that makes a setting so that a potential of the data signal supplied by the data signal supplying step when the light source is OFF is different from a potential of the data signal supplied when the light source is ON.

31. A transflective display device having a gray scale controlled according to image data prepared for use in either a reflective display mode or a transmissive display mode, the display device comprising:
   a first mechanism passing a first light component polarized to a first direction and reflecting or absorbing a light component other than the first light component;
   a second mechanism passing a second light component polarized to a second direction and reflecting or absorbing a light component other than the second light component;
   a third mechanism disposed between the first mechanism and the second mechanism, the third mechanism having a transmission polarization axis that is switchable between the reflective and transmissive display modes and rangeable from the first direction to the second direction according to the image data in each of the reflective and transmissive display modes; and
   a driving circuit connected to the third mechanism, the driving circuit being operable to apply first image data to the third mechanism in one of the reflective and transmissive modes, and to apply second image data inverse in logic to the first image data to the third mechanism in the other of the reflective and transmissive modes.

32. In a transflective display device having:
- a first polarized light separating mechanism that permits a first light component polarized to a first direction to pass therethrough and permits a light component other than the first light component to reflect thereagainst or be absorbed thereinto;
- a second polarized light separating mechanism that permits a second light component polarized to a second direction to pass therethrough and permits a light component other than the second light component to reflect thereagainst or be absorbed thereinto;
- a variable transmission polarization axis mechanism disposed between the first polarized light separating mechanism and the second polarized light separating mechanism, the variable transmission polarization axis mechanism having a transmission polarization axis that is switchable between the reflective and transmissive display modes and being changeable to range from the first direction to the second direction according to the image data in each of the reflective and transmissive display modes; and
- a driving circuit connected to the variable transmission polarization axis mechanism;

the improvement comprising:
- operating the driving circuit to apply first image data to the variable transmission polarization axis mechanism in one of the reflective and transmissive modes, and to apply second image data inverse in logic to the first image data to the variable transmission polarization axis mechanism in the other of the reflective and transmissive modes.

* * * * *

UNITED STATES PATENT AND TRADEMARK OFFICE
CERTIFICATE OF CORRECTION

PATENT NO.   : 6,462,724 B1
DATED        : October 8, 2002
INVENTOR(S)  : Ozawa et al.

It is certified that error appears in the above-identified patent and that said Letters Patent is hereby corrected as shown below:

Title page,
Item [75], Inventors, "Tsuyoshi Maeda" residence "Yamanashi-Ken" should be
-- Ryou-cho --
Item [56], References Cited, U.S. PATENT DOCUMENTS, add:
-- 6,008,871  12/1999  Okumura --

Column 4,
Line 52, "In" should be -- in --

Column 9,
Line 52, delete $2^{nd}$ occurrence of "is"

Column 25,
Line 40, after "operations" insert -- of --

Column 40,
Lines 30-31, "encompasses" should be -- encompass --

Column 43,
Line 62, "claim 27" should be -- claim 24 --

Signed and Sealed this

Twenty-eighth Day of September, 2004

JON W. DUDAS
*Director of the United States Patent and Trademark Office*